(12) United States Patent
Kai et al.

(10) Patent No.: US 6,925,041 B2
(45) Date of Patent: Aug. 2, 2005

(54) INFORMATION RECORDING APPARATUS USING A MARK EDGE RECORDING

(75) Inventors: Tsutomu Kai, Katano (JP); Takumi Matsuura, Kyoto (JP); Yoshitaka Mitsui, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 337 days.

(21) Appl. No.: 10/145,182

(22) Filed: May 13, 2002

(65) Prior Publication Data

US 2002/0186633 A1 Dec. 12, 2002

(30) Foreign Application Priority Data

May 11, 2001 (JP) ........................................ 2001-141220

(51) Int. Cl.[7] .......................................... G11B 7/0045
(52) U.S. Cl. ................................ 369/47.51; 369/59.11; 369/53.34
(58) Field of Search ..................... 369/47.51, 59.11, 369/47.53, 53.34

(56) References Cited

U.S. PATENT DOCUMENTS 5,216,660 A * 6/1993 Iimura ........................ 369/116
5,629,924 A * 5/1997 Yokogawa et al. ......... 369/275.3
6,157,604 A * 12/2000 Feyh et al. ................ 369/59.21

FOREIGN PATENT DOCUMENTS

| JP | 09212866 A | 8/1997 | |
| JP | 2000182244 A | * 6/2000 | ......... G11B/7/0045 |
| JP | 2000207742 A | 7/2000 | |
| JP | 2000231717 A | 8/2000 | |

OTHER PUBLICATIONS

Translation of JP 2000182244 A.*

* cited by examiner

Primary Examiner—Brian E. Miller
Assistant Examiner—Peter Vincent Agustin
(74) Attorney, Agent, or Firm—Akin Gump Strauss Hauer & Feld, LLP

(57) ABSTRACT

In order to determine a laser emission waveform rule for a recording medium, such as a write-once optical disc, the present invention provides an information recording apparatus, an information recording method and an information recording system capable of determining optimal recording conditions by recording data for approximately one rotation, by reproducing the recorded area, by measuring a phase error for each combination of the length of a mark and the length of a space immediately before or after the mark and by changing an emission waveform rule on the basis of the measured phase error.

11 Claims, 19 Drawing Sheets

Phase error table

Leading Edge

(a)

| Length of preceding space | Length of mark | | | | | |
|---|---|---|---|---|---|---|
| | 3T | 4T | 5T | 6T | ... | 14T |
| 3T | L3·3 | L3·4 | L3·5 | L3·6 | ... | L3·14 |
| 4T | L4·3 | L4·4 | L4·5 | L4·6 | ... | L4·14 |
| 5T | L5·3 | L5·4 | L5·5 | L5·6 | ... | L5·14 |
| 6T | L6·3 | L6·4 | L6·5 | L6·6 | ... | L6·14 |
| ... | ... | ... | ... | ... | ... | ... |
| 14T | L14·3 | L14·4 | L14·5 | L14·6 | ... | L14·14 |

Trailing Edge

(b)

| Length of preceding space | Length of mark | | | | | |
|---|---|---|---|---|---|---|
| | 3T | 4T | 5T | 6T | ... | 14T |
| 3T | T3·3 | T3·4 | T3·5 | T3·6 | ... | T3·14 |
| 4T | T4·3 | T4·4 | T4·5 | T4·6 | ... | T4·14 |
| 5T | T5·3 | T5·4 | T5·5 | T5·6 | ... | T5·14 |
| 6T | T6·3 | T6·4 | T6·5 | T6·6 | ... | T6·14 |
| ... | ... | ... | ... | ... | ... | ... |
| 14T | T14·3 | T14·4 | T14·5 | T14·6 | ... | T14·14 |

FIG. 8

(a) Recording clock
(b) Record data
(c) Laser driving waveform
(d) Record mark
(e) Reproduced RF waveform
(f) Binarized output
(g) Channel clock FIG. 15
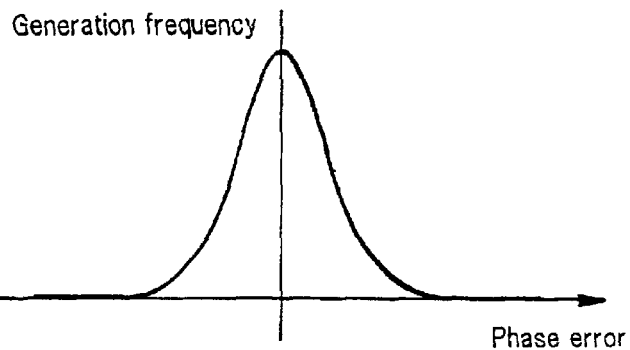
(a) Generation distribution of phase errors
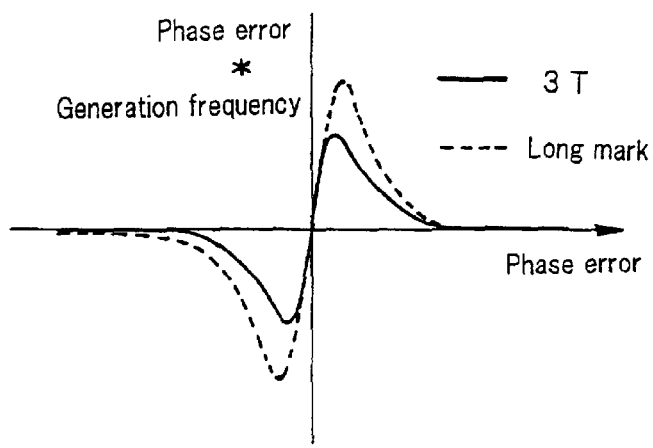
(b) Phase error amount near 0% asymmetry
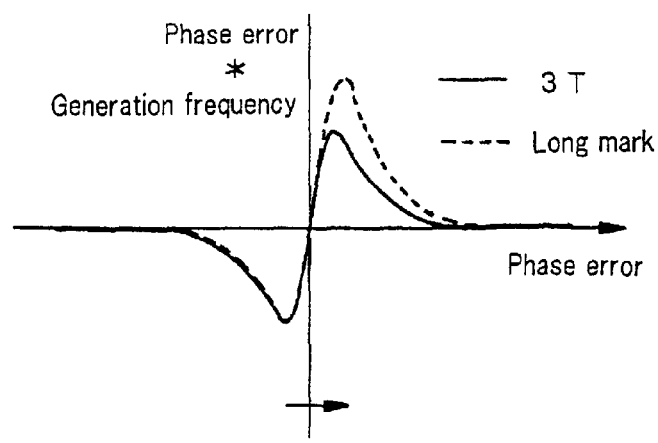
(c) Phase error amount near 10% asymmetry

INFORMATION RECORDING APPARATUS USING A MARK EDGE RECORDING

BACKGROUND OF THE INVENTION

The present invention relates to an information recording apparatus, an information recording method and an information recording system for recording information on an optical disc serving as a recording medium.

In recent years, in the field of information recording apparatuses, write-once optical discs, such as CD-R discs, and rewritable optical discs, such as CD-RW discs, have been commercialized as recording media. Recently, by shortening the wavelength of a semiconductor laser serving as a laser light source, by decreasing the spot diameter of a high-NA objective lens having a high numerical aperture, by employing thin substrates and by taking other measures, large-capacity optical discs, such as DVD-R, DVD-RW, DVD-RAM discs, have been used in information recording apparatuses.

For example, recording information on a DVD-R disc, one of recording media (dyestuff-based recording media) having a dyestuff recording layer, is carried out by a mark-edge recording system for recording information at the leading and trailing edges of marks on the recording medium. In the recording on this kind of large-capacity optical disc, a pulse control system for adjusting the intensity of the laser depending on the quality of an optical disc to be used in consideration of improper mark formation due to insufficient thermal storage and cooling speed of the recording medium has been put into practical use. This pulse control system carries out ON/OFF control of the laser at short intervals to adjust the intensity of the laser. In this pulse control system, a laser emission waveform rule (hereafter referred to as a write strategy) wherein multiple pulses in a pulse train comprising the combination of a head heating pulse and a plurality of following continuous heating pulses has been proposed. In addition, as another pulse control system, a method wherein the pulse width of the head heating pulse is changed depending on the length of a mark and the length of a space immediately before or after the mark has also been proposed.

When recording on a dyestuff-based recording medium or a recording medium based on a phase-change recording system, recording conditions differ depending on ambient temperature and the type of the recording medium, and the optimal write strategy at that time also differs. Japanese Patent Unexamined Publication No. 2000-207742 discloses an information recording method for determining a write strategy being different at every recording time.

FIG. 18 is a block diagram showing the configuration of an information recording apparatus disclosed in Japanese Patent Unexamined Publication No. 2000-207742. FIG. 19 is a block diagram showing the configuration of a controller in the information recording apparatus of FIG. 18.

In the conventional information recording apparatus, when determining a write strategy, for example when determining emission power (recording power) at the time of recording, asymmetry occurring in a signal at the time of reproduction of a recorded area is adjusted, and the power is determined. In addition, when determining an emission waveform rule, jitter occurring in the signal at the time of reproduction of the recorded area is adjusted, and the rule is determined. Furthermore, in the conventional information recording apparatus, with respect to asymmetry and jitter, a predetermined pattern (test pattern) formed of marks and spaces having 3 times (3T) to 11 times (11T) and 14 times (14T) the period (T) of a channel clock serving as a data extraction clock signal is written (recorded) on trial at several kinds of recording power levels, and data at each recording power level is measured by using the reproduced signal of the predetermined pattern.

FIG. 20 is a waveform diagram showing the measured values of asymmetry (a) and jitter (b) in the conventional information recording apparatus. The upper waveform in FIG. 20(a) indicates measured asymmetry [%], and the lower waveform indicates the position of a focal point [μm]. Furthermore, the upper waveform in FIG. 20(b) indicates measured jitter [%], and the lower waveform indicates the tilt [deg] of an optical disc. The waveforms in FIG. 20 are based on measured values obtained when the optical disc carries out one rotation.

As shown in FIGS. 20(a) and (b), in the reproduced signal of the test pattern, the asymmetry and jitter values change because of the influence of stress during recording and reproduction, for example defocusing, that is, the displacement of the focal point, the tilt of the disc in the tangential direction of its track, etc.

Since the asymmetry and jitter values change as shown in FIG. 20, in the conventional information recording apparatus, the respective average values of the asymmetry and jitter values are calculated, and by using the calculated average asymmetry and jitter values, recording power and an emission waveform rule are determined. In the conventional information recording apparatus, in order to remove the AC components of the stress caused by the rotation of the disc, the asymmetry and jitter values are detected for one rotation of the disc, and by using the average values of the asymmetry and jitter values, a write strategy for the disc is determined.

Hence, in the method of determining a write strategy (laser emission waveform rule) in the conventional information recording apparatus, it is necessary to carry out trial writing many times in order to obtain optimal recording conditions. For example when data recording for one rotation is carried out for one condition, it is necessary to use a dozen or so tracks as a learning area for one-time learning. Furthermore, a write-once optical disc, such as a DVD-R disc, has a constraint that recording cannot be carried out on tracks recorded once and areas reserved for adjustment is scarce. Hence, in the conventional information recording apparatus, when responding to incremental writing, it is necessary to make the one-time learning area used for determining a write strategy (laser emission waveform rule) as small as possible.

In the conventional information recording apparatus, for example in an optical disc, such as a DVD-R disc, the area usable as a learning area is a PCA (Power Calibration Area) reserved as an area for writing power adjustment, and the PCA has 7056 sectors. In the conventional information recording apparatus, an information recording method for determining the above-mentioned write strategy by using the 7056 sectors of the PCA has been used. However, in this single area, sufficient learning for determining the write strategy cannot be carried out. Even if trial writing is carried out while changing only the parameters greatly contributing to the determination of the write strategy, sufficient learning times cannot be obtained in the conventional information recording apparatus, whereby no appropriate write strategy can be determined.

SUMMARY OF THE INVENTION

The present invention is intended to provide an information recording apparatus, an information recording method and an information recording system capable of determining an optimal write strategy (laser emission waveform rule) at each writing time and capable of optimizing recording conditions by carrying out trial writing the number of times less than that in the case of the conventional information recording method.

In order to attain the above-mentioned object, an information recording apparatus in accordance with the present invention, using a mark edge recording system for recording information on a recording medium at the leading edge and the trailing edge of each mark, comprises:

a recording section for recording record data by applying laser light to the recording face of the above-mentioned recording medium on the basis of a recording pulse train determined depending on the length of a recorded mark and the length of a space immediately before or after the recorded mark, a reproduction section for outputting a reproduced RF signal from the above-mentioned recording medium, a phase error detection section for generating a data extraction clock signal from the reproduced RF signal delivered from the above-mentioned reproduction section and for detecting the phase difference between the above-mentioned reproduced RF signal and the above-mentioned data extraction clock signal as a phase error for each combination of the length of a mark and the length of a space before or after the mark, a recording power optimization section for extracting information changing depending on recording power, such as asymmetry and modulation degree, from the above-mentioned reproduced RF signal and for determining recording power so that the extracted information becomes a predetermined value, a recording compensation parameter adjustment section for adjusting a recording compensation parameter on the basis of phase error data delivered from the above-mentioned phase error detection section and detected for each combination of the length of a mark and the length of a space before or after the mark and for determining an emission waveform rule for the above-mentioned recording medium.

a recording pulse train correction section for correcting the recording pulse train on the basis of the emission waveform rule determined by the above-mentioned recording compensation parameter adjustment section, and a laser driving section, driven by the recording pulse train formed by the above-mentioned recording pulse train correction section by the recording power determined by the above-mentioned recording power optimization section, for applying desired laser to the above-mentioned recording medium.

In addition, an information recording apparatus in accordance with the present invention may also be configured so as to further comprise a phase error adjustment section for adjusting a phase error target depending on phase error data, delivered from the above-mentioned phase error detection section, for each combination of the length of a mark and the length of a space before or after the mark, and target asymmetry, delivered from the above-mentioned recording power optimization section, for each combination of the length of a mark and the length of a space before or after the mark.

Furthermore, an information recording apparatus in accordance with the present invention may also be configured so as to further comprise a rotation phase detection section for detecting the rotation phase of a mounted recording medium so that the phase error adjustment section adjusts a phase error for every rotation phase of the above-mentioned recording medium on the basis of rotation phase data from the above-mentioned rotation phase detection section.

An information recording apparatus in accordance with another aspect of the present invention, using a mark edge recording system for recording information on a recording medium at the leading edge and the trailing edge of each mark, comprises:

a recording section for recording record data by applying laser light to the recording face of the above-mentioned recording medium on the basis of a recording pulse train determined depending on the length of a recorded mark and the length of a space immediately before or after the recorded mark, a reproduction section for reproducing information recorded on the above-mentioned recording medium and for outputting a reproduced RF signal, a recording power optimization section for extracting information changing depending on recording power, such as asymmetry and modulation degree, from the above-mentioned reproduced RF signal in a recording pulse train determined for each recording medium and for determining recording power so that the extracted information becomes a predetermined value, a phase error detection section for generating a data extraction clock signal from the above-mentioned reproduced RF signal and for detecting the phase difference between the above-mentioned reproduced RF signal and the above-mentioned data extraction clock signal as a phase error for each combination of the length of a mark and the length of a space immediately before or after the mark, a recording compensation parameter adjustment section for determining an optimal emission waveform rule on the basis of the phase error detected by the above-mentioned phase error detection section at the recording power determined by the above-mentioned recording power optimization section, and a recording pulse train correction section for correcting the above-mentioned recording pulse train on the basis of the emission waveform rule determined by the above-mentioned recording compensation parameter adjustment section.

An information recording apparatus in accordance with still another aspect of the present invention, using a mark edge recording system for recording information on a recording medium at the leading edge and the trailing edge of each mark, comprises:

a recording section for recording record data by applying laser light to the recording face of the above-mentioned recording medium on the basis of a recording pulse train determined depending on the length of a recorded mark and the length of a space immediately before or after the recorded mark, the reproduction section for reproducing information recorded on the above-mentioned recording medium and for outputting a reproduced RF signal, a recording power optimization section for extracting information changing depending on recording power, such as asymmetry and modulation degree, from the above-mentioned reproduced RF signal in a recording pulse train determined for each recording medium and for determining recording power so that the extracted information becomes a predetermined value, a phase error detection section for generating a data extraction clock signal from the above-mentioned reproduced RF signal and for detecting the phase difference between the above-mentioned reproduced RF signal and the above-mentioned data extraction clock signal as a phase error for each combination of the length of a mark and the length of a space immediately before or after the mark, a phase error adjustment section for setting an offset to an output signal from the above-mentioned phase error detection section depending on target asymmetry from the above-mentioned recording power optimization section, a recording compensation parameter adjustment section for determining an optimal emission waveform rule on the basis of the compensated phase error from the above-mentioned phase error adjustment section at the recording power determined by the above-mentioned recording power optimization section, and a recording pulse train correction section for correcting the above-mentioned recording pulse train on the basis of the emission waveform rule determined by the above-mentioned recording compensation parameter adjustment section.

An information recording apparatus in accordance with still another aspect of the present invention, using a mark edge recording system for recording information on an optical disc serving as a recording medium at the leading edge and the trailing edge of each mark, comprises:

a recording section for recording record data by applying laser light to the recording face of the above-mentioned recording medium on the basis of a recording pulse train determined depending on the length of a recorded mark and the length of a space immediately before or after the recorded mark, a reproduction section for reproducing information recorded on the above-mentioned recording medium and for outputting a reproduced RF signal, a recording power optimization section for extracting information changing depending on recording power, such as asymmetry and modulation degree, from the above-mentioned reproduced RF signal in a recording pulse train determined for each recording medium and for determining recording power so that the extracted information becomes a predetermined value, a phase error detection section for generating a data extraction clock signal from the above-mentioned reproduced RF signal and for detecting the phase difference between the above-mentioned reproduced RF signal and the above-mentioned data extraction clock signal as a phase error for each combination of the length of a mark and the length of a space immediately before or after the mark, a rotation phase detection section for measuring the rotation change components of the above-mentioned phase error detection section depending on phase errors detected in a one-rotation recording area wherein recording is carried out on the above-mentioned optical disc in the same condition, a phase error adjustment section for setting the offset of the above-mentioned phase error detection section depending on the measured rotation phase, a recording compensation parameter adjustment section for determining an optimal emission waveform rule on the basis of the compensated phase error from the above-mentioned phase error adjustment section at the recording power determined by the above-mentioned recording power optimization section, and a recording pulse train correction section for correcting the above-mentioned recording pulse train on the basis of the emission waveform rule determined by the above-mentioned recording compensation parameter adjustment section.

An information recording method in accordance with the present invention, using a mark edge recording system for recording information on a recording medium at the leading edge and the trailing edge of each mark, comprises:

a step of recording record data by applying laser light to the recording face of the above-mentioned recording medium on the basis of the recording pulse train determined depending on the length of a recorded mark and the length of a space immediately before or after the recorded mark, a step of outputting a reproduced RF signal from the above-mentioned recording medium, a step of generating a data extraction clock signal from the above-mentioned reproduced RF signal, a step of detecting the phase error between the above-mentioned reproduced RF signal and the above-mentioned data extraction clock signal for each combination of the length of a mark and the length of a space immediately before or after the mark, a step of determining recording power for extracting information changing depending on recording power, such as asymmetry and modulation degree, from the above-mentioned reproduced RF signal in a recording pulse train determined for each recording medium and for determining recording power so that the extracted information becomes a predetermined value, a step of determining an emission waveform rule for the above-mentioned recording medium by adjusting a recording compensation parameter on the basis of the above-mentioned phase error for each combination of the length of a mark and the length of a space immediately before or after the mark, a step of correcting the recording pulse train on the basis of the above-mentioned emission waveform rule having been determined, and a step of applying desired laser, driven by the recording pulse train corrected by the above-mentioned recording power having been determined, to the above-mentioned recording medium.

An information recording system in accordance with the present invention comprises:

an information recording apparatus having a function of learning an emission waveform rule and recording power for recording, a display section for displaying various kinds of information regarding the above-mentioned information recording section, a remote-control section for inputting commands to the above-mentioned information recording section, a controller for controlling the whole system on the basis of the commands from the above-mentioned remote-control section, a receiving section for receiving broadcasts, such as terrestrial broadcasts, a decoder for converting received broadcasts into audio or video information, and an encoder for converting audio or video information into data suited for recording.

With the present invention, an optimal write strategy (laser emission waveform rule) can be determined at each writing time by carrying out trial writing a fewer number of times, whereby recording conditions for each recording medium can be more appropriate.

In the present invention, by learning the optimization conditions for recording compensation (write strategy), the step of detecting the optimal recording power can be omitted. In the information recording method in accordance with the present invention, after the optimal recording conditions between a recording medium and a disc recording/reproducing apparatus is learnt, the optimization conditions are recorded on the recording medium or the disc recording/reproducing apparatus. After this, the optimal recording conditions are restored by reproducing the optimal recording conditions. At this time, the restoration can be attained by carrying out only the recording power optimizing step of correcting power drop due to lens aperture or the like as necessary.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 8 is an explanatory view of tables indicating the output result of the phase error detector in accordance with the first embodiment;

FIG. 15 is a waveform diagram illustrating detection errors of the phase error detector in accordance with the second embodiment;

It will be recognized that some or all of the Figures are schematic representations for purposes of illustration and do not necessarily depict the actual relative sizes or locations of the elements shown.

DETAILED DESCRIPTION OF THE INVENTION

Preferable embodiments of an information recording apparatus, an information recording method and an information recording system in accordance with the present invention will be described below by using the accompanying drawings.

In each embodiment described below, explanations are given by using an optical information recording/reproducing apparatus for carrying out recording (writing) on a DVD-R medium having DVD-ROM-formatted code data and known as a dyestuff-based medium (for example, a dyestuff-based optical disc). In addition, as the data modulation system of the information recording method in embodiments described below, an example wherein mark edge recording is carried out by using 8–16 modulation codes is used. In other words, in the embodiments described below, by using the above-mentioned optical disc and record data, a semiconductor laser is made to emit light by multiple pulses, thereby forming record marks and thereby recording information.

<<First Embodiment>>

An information recording apparatus and an information recording method of a first embodiment in accordance with the present invention will be described below by using the accompanying FIG. 1 and FIG. 2.

Figure 1:
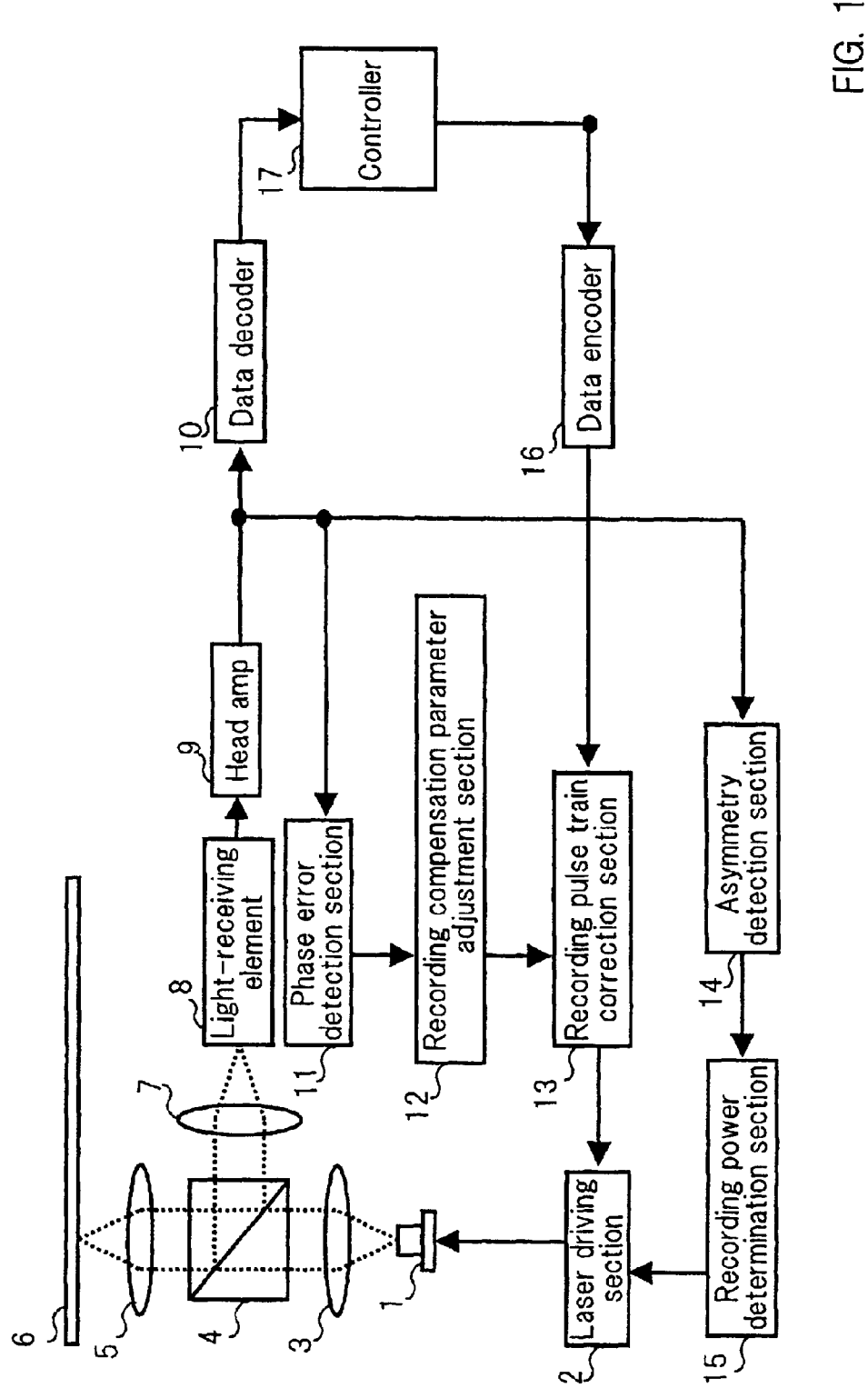
FIG. 1 is a block diagram showing the configuration of the information recording apparatus of a first embodiment in accordance with the present invention.

FIG. 1 is a block diagram showing the configuration of the information recording apparatus of the first embodiment in accordance with the present invention.

In the information recording apparatus shown in FIG. 1, a semiconductor laser 1 serving as a laser light source is driven and controlled by a laser driving section 2, and high-power laser light from the semiconductor laser 1 is condensed and applied to an optical disc 6 via a collimator lens 3, a beam splitter 4 and an objective lens 5. The recording layer of the optical disc 6, to which the laser light is applied, changes in its physical and optical characteristics, whereby information is recorded.

On the other hand, during reproduction in the information recording apparatus, low-power laser light from the semiconductor laser 1 is condensed and applied to the optical disc 6 via the collimator lens 3, the beam splitter 4 and the objective lens 5. Then, at the beam splitter 4, reflected light from the optical disc 6 is guided to a light-receiving element 8 via a detection lens 7. The light-receiving element 8 converts an optical signal into an electrical signal and outputs the signal to a head amp 9. The head amp 9 converts the electrical signal from the light-receiving element 8 into a signal indicating the physical information of the optical disc 6. The signal from the head amp 9 is input to a data decoder 10 and subjected to processes, such as demodulation and error correction, and data recorded on the optical disc 6 is generated. It is herein assumed that the semiconductor laser 1, the laser driving section 2, the collimator lens 3, the beam splitter 4 and the objective lens 5 constitute a recording section. In addition, it is assumed that the detection lens 7, the light-receiving element 8 and the head amp 9 constitute a reproduction section.

Furthermore, the signal from the head amp 9 is input to a phase error detection section 11, and a phase error from a channel clock is detected for each record pattern. A recording compensation parameter adjustment section 12 optimizes an emission waveform rule on the basis of the detection result at the phase error detection section 11. A recording pulse train correction section 13 corrects a control signal to be supplied to the laser driving section 2 depending on the record data output from a data encoder 16. An asymmetry detection section 14 detects the asymmetry of the signal obtained when the recorded signal is reproduced. A recording power determination section 15 determines optimal recording power on the basis of the result of the asymmetry detection section 14. The data encoder 16 assigns an error correction code to data to be recorded and carries out data modulation, thereby generating record data serving as a basic driving signal to be supplied to the laser. A controller 17 controls the whole of the information recording apparatus configured as described above. Herein, the asymmetry detection section 14 and the recording power determination section 15 constitute a recording power optimization section, and this recording power optimization section determines the optimal recording power on the basis of the result at the asymmetry detection section 14.

As described above, the laser light emitted from the semiconductor laser 1, which is driven by the laser driving section 2, passes through the collimator lens 3 and the beam splitter 4, is condensed on the optical disc 6 by the objective lens 5 and used for recording, reproduction or trial-writing of information.

In reproducing operation, after the reflected light from the optical disc 6 passes through the objective lens 5, the light is separated from the incident light by the beam splitter 4, and passes through the detection lens 7, whereby an image is formed on the light-receiving element 8. The detected signal at the light-receiving element 8 is converted into an RF signal or the like by the head amp 9, further converted into a reproduced signal by the data decoder 10 and sent to the controller 17.

In recording operation for recording data on the optical disc 6, record data is output from the controller 17, passes through the data encoder 16 wherein the assignment of an error correction code and data modulation, such as 8–16 modulation, are carried out. In the recording pulse train correction section 13, the signal subjected to data modulation as described above is converted into multiple pulse trains obtained by correcting a recording pulse train, depending on the length of a mark of the record signal and the length of a space immediately before or after the mark, and then input to the laser driving section 2. This laser driving section 2 is driven and controlled by the controller 17.

In the first embodiment, an example wherein the recording pulse train is corrected depending on the length of a mark of the record signal and the length of a space immediately before the mark, is described. However, the present invention is configured so that the recording pulse train is corrected depending on the length of a mark of the record signal and the length of a space immediately before or after the mark. This is also similarly applicable to embodiments described below.

In the information recording apparatus of the first embodiment configured as described above, in order to determine emission power (recording power) at the time of recording, a test pattern for learning this recording power is recorded. Next, an area wherein the test pattern is recorded is reproduced, and the relationship between the recording power and asymmetry is measured. On the basis of the measurement result of the test pattern, the recording power determination section 15 determines optimal recording power that is used as target asymmetry.

Next, a test pattern for determining an emission waveform rule is recorded. The area wherein the test pattern is recorded is reproduced, and the relationship between a prepared emission waveform rule and a phase error amount is examined. In other words, the phase error amount in the combination of the length of each mark and the length of each space immediately before the mark is measured. An emission waveform rule wherein the phase error amount becomes zero is estimated from the measured phase error amount, whereby a desired emission waveform rule is determined.

In the information recording apparatus of the first embodiment, with respect to asymmetry and jitter, a predetermined pattern (test pattern) formed of marks and spaces having lengths of 3 times (3T) to 11 times (11T) and 14 times (14T) the period (T) of the channel clock serving as a data extraction clock signal is written (recorded) on trial at several kinds of emission power levels, and data at each recording power level is detected by using the reproduced signal of the predetermined pattern.

Figure 2:
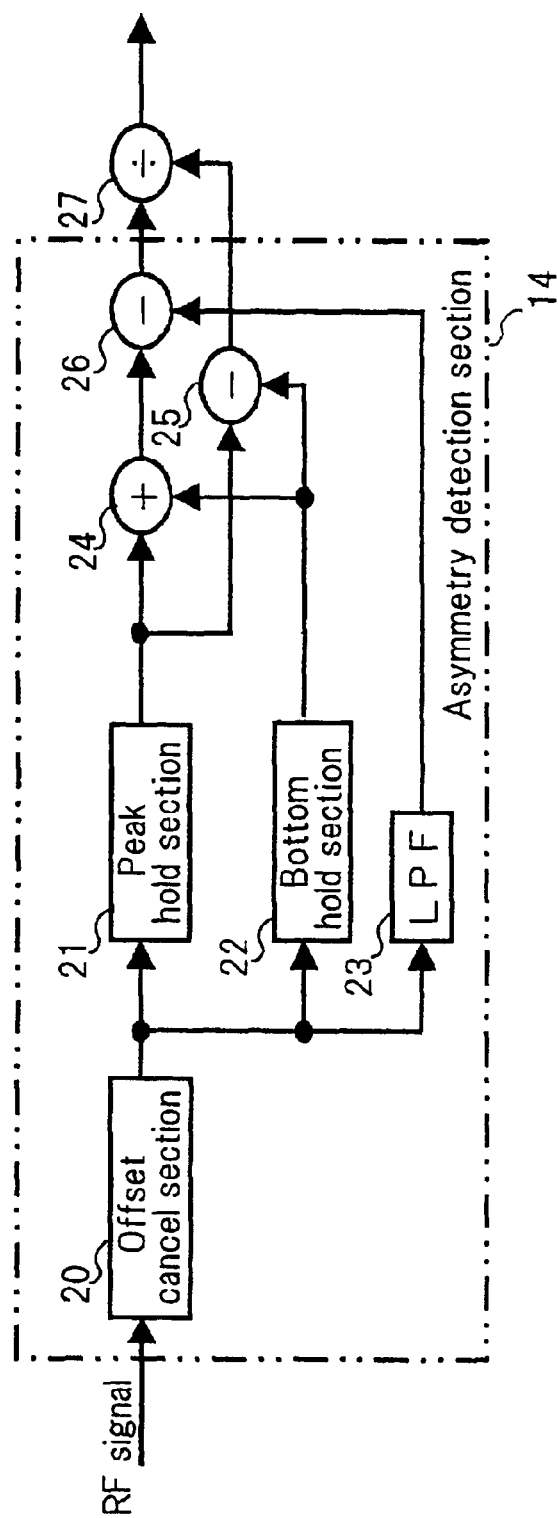
FIG. 2 is a block diagram showing the configuration of an asymmetry detection section in accordance with the first embodiment.

FIG. 2 is a block diagram showing the internal configuration of the asymmetry detection section 14 in accordance with the first embodiment.

As shown in FIG. 2, the asymmetry detection section 14 of the first embodiment comprises an offset cancel section 20 for eliminating the influence of stray light and the like, a peak hold section 21 for holding the high level (the upper peak value) of the RF signal from the head amp 9 and for detecting the bright level (peak value) of the long space (14T), a bottom hold section 22 for holding the bottom level (the bottom peak value) of the RF signal and for detecting the dark level (bottom value) of the long mark (14T), and a low-pass filter (LPF) 23 for holding the average level of the RF signal and for detecting the DC levels of the continuous short marks. This asymmetry detection section 14 calculates the average value of the bright level of the long space and the dark level of the long mark, and normalizes the difference between this average value and the DC values of the continuous short marks with respect to the difference between the bright level of the long space and the dark level of the long mark, thereby detecting asymmetry (ASYM).

The bright level of the long space is the maximum level of the RF signal, and the dark level of the long mark is the minimum level of the RF signal. In addition, the average level of the RF signal is the average level of the maximum level and the minimum level of the RF signal.

Next, asymmetry (ASYM) will be described below.

Figure 3:
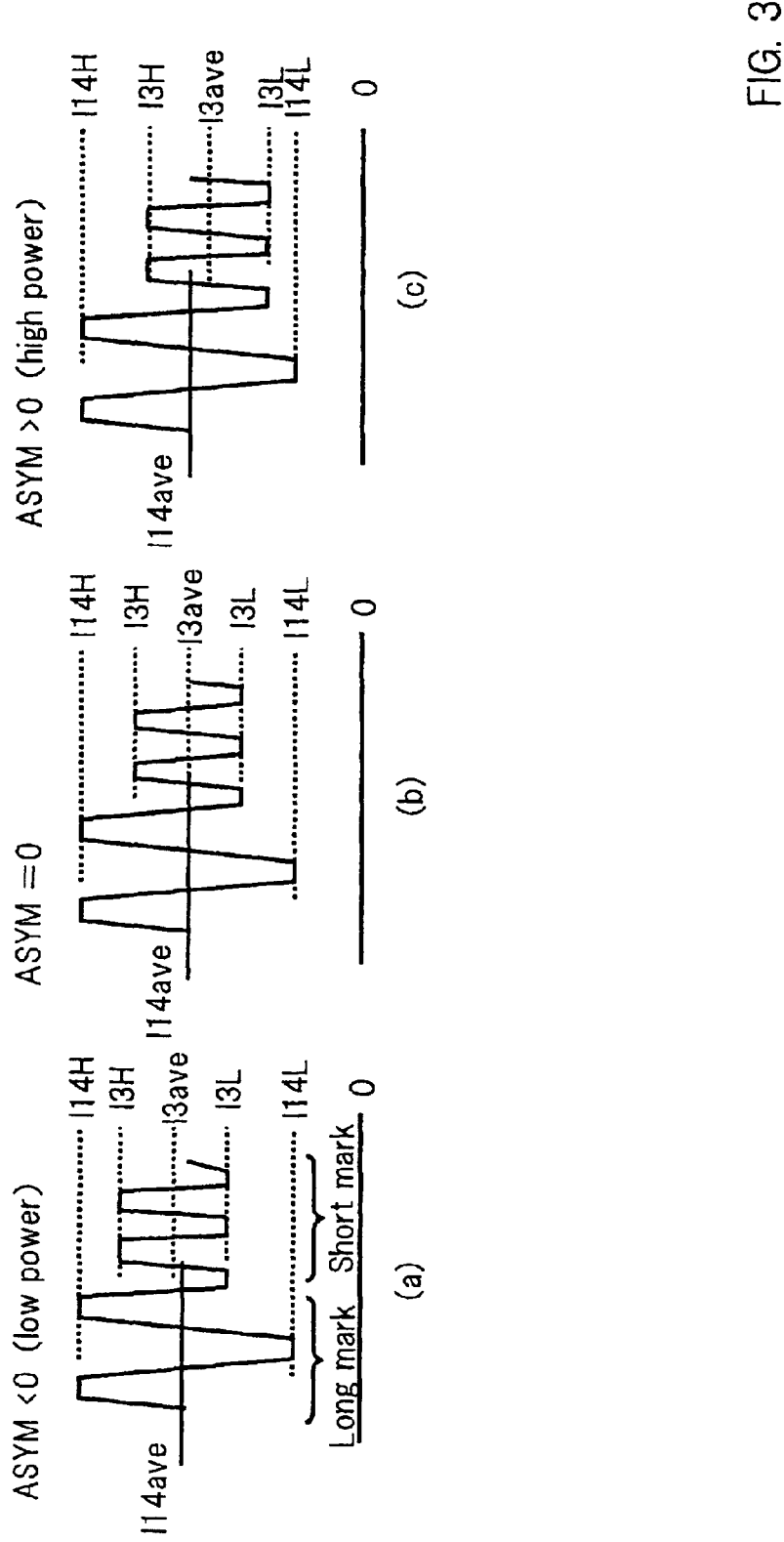
FIG. 3 is a waveform diagram illustrating the asymmetry relationship between recording power and a reproduced RF signal.

FIG. 3 is the waveform diagram of the RF signal output from the head amp 9 in the case when recording power is changed (at three levels) for the optical disc 6. In FIG. 3, (*a*) shows a case wherein the recording power is low, and (*c*)

shows a case wherein the recording power is high, and (b) shows a case wherein the recording power is between (a) and (c). In addition, in FIG. 3, "I14H" designates the high level of the long space (14T), and "I14L" designates the bottom level of the long mark (14T). Furthermore, "I3H" designates the high level of the short space (3T), and "I3L" designates the bottom level of the short mark (3T). Besides, "I14ave" designates the average level of the long mark and the long space (14T), and "I3ave" designates the average level of the short mark and the short space(3T).

As shown in FIG. 3(a), when the recording power is low, the average level (I3ave) of the short mark and the short space is higher than the average level (I14ave) of the long mark and the long space, and the asymmetry (ASYM) has a negative value (ASYM<0). In addition, as shown in FIG. 3(c), when the recording power is high, the average level (I3ave) of the short mark and the short space is lower than the average level (I14ave) of the long mark and the long space, and the asymmetry (ASYM) has a positive value (ASYM>0). In this way, when the recording power is increased, the average level (I3ave) of the short mark and the short space becomes relatively lower than the average level (I14ave) of the long mark and the long space. In actual practice, when the recording power is increased, the average level of the long mark and the long space lowers gradually; however, the average level of the short mark and the short space lowers more significantly.

FIG. 3(b) shows a state wherein the asymmetry (ASYM) is 0 and the average level (I14ave) of the long mark and the long space coincides with the average level (I3ave) of the short mark and the short space.

As described above, in the information recording apparatus of the first embodiment, the average level (I14ave) of the long mark and the long space and the average level (I3ave) of the short mark and the short space are detected, and the asymmetry is calculated, whereby the recording power is determined.

Figure 4:
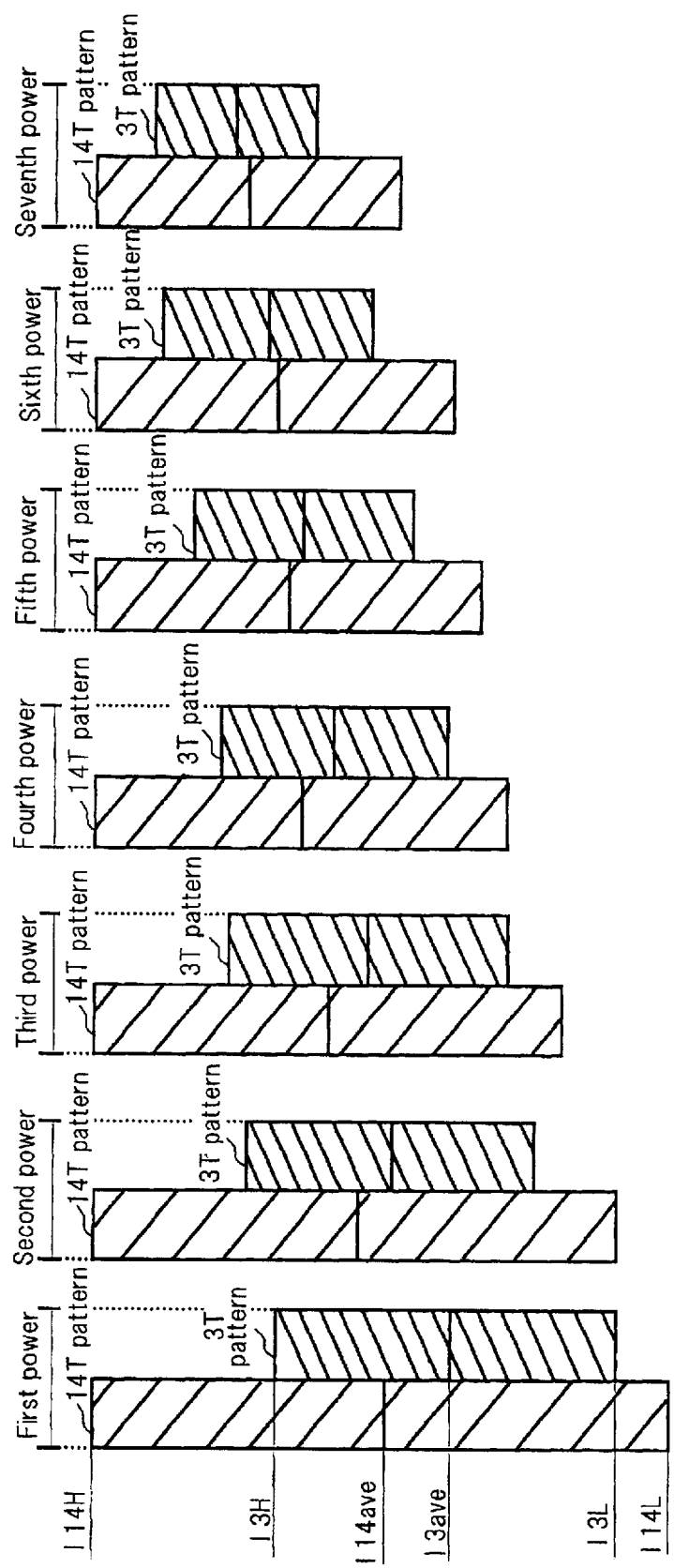
FIG. 4 is a state diagram illustrating an operation during recording power learning.

FIG. 4 is a state diagram showing the level of a reproduced signal at the time when the test pattern is recorded on the optical disc 6 at a plurality of levels (seven levels) of the recording power in the information recording apparatus of the first embodiment. FIG. 4 shows the high levels (I14H, I3H), the bottom levels (I14L, I3L) and the average levels (I14ave, I3ave) at the time when the pattern of the long marks (14T) and the pattern of the short marks (3T) are recorded at each level of the recording power.

In the information recording apparatus of the first embodiment, as shown in FIG. 4, the pattern of the long marks (14T) and the pattern of the short marks (3T) are recorded alternately at the seven levels of the recording power. Then, the peak value and the bottom value of each long mark pattern and the average level of the short mark pattern, recorded at each different level of the recording power, are detected, and the asymmetry is calculated. In the first embodiment shown in FIG. 4, the example wherein recording is carried out at seven levels of the recording power centered at standard power and the asymmetry is calculated from the RF signal generating during reproduction is explained; however, the present invention is not limited to this kind of method; the asymmetry may be calculated by detecting the marks and spaces in their respective patterns recorded at the plurality of the recording power levels.

Figure 5:
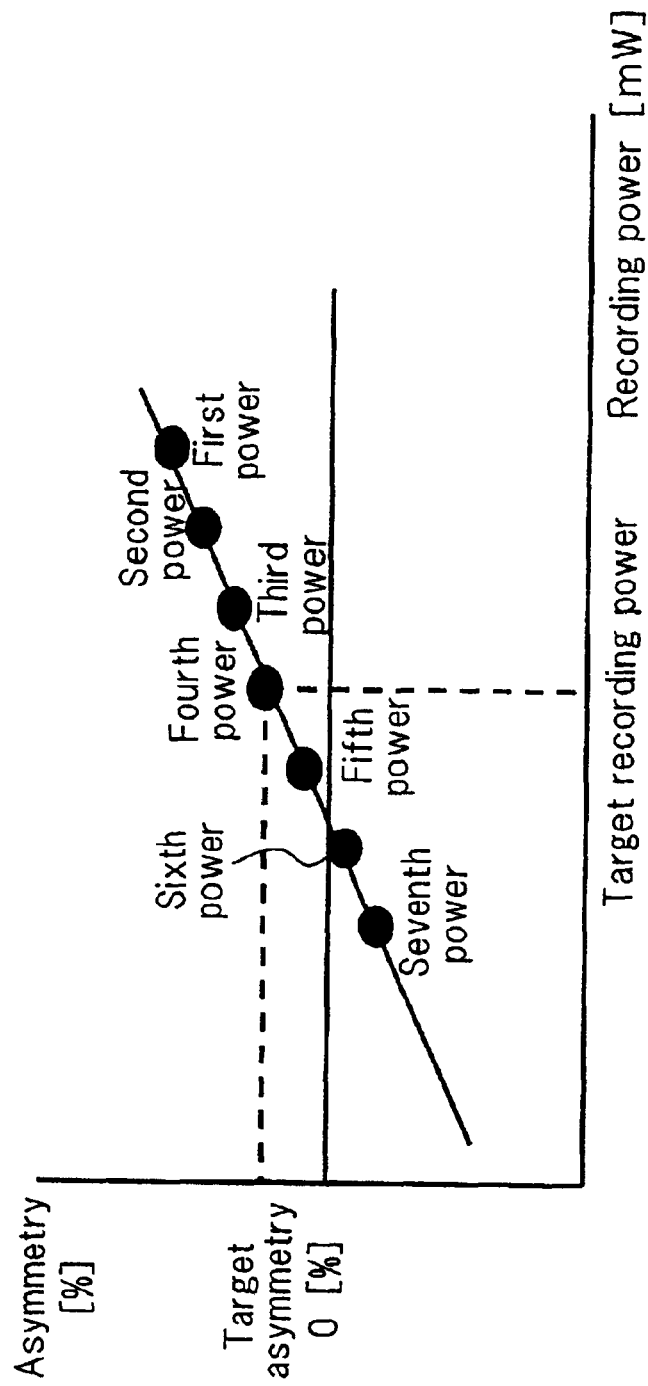
FIG. 5 is a graph illustrating a recording operation during recording power learning.

FIG. 5 is a graph showing the result of the calculation of the asymmetry from the RF signal at the time when the patterns recorded at the seven levels of the recording power, shown in FIG. 4, are reproduced. In FIG. 5, the abscissa represents recording power [mW], and the ordinate represents asymmetry [%]. As shown in FIG. 5, the relationship between the recording power and the asymmetry indicates a monotonously increasing characteristic near target asymmetry. In the case when the target asymmetry is set and when the recording power corresponding to the target asymmetry is obtained, the recording power can be determined by measuring the asymmetry at appropriate recording power level intervals near the target asymmetry and by interpolating the measured data.

Figure 6:
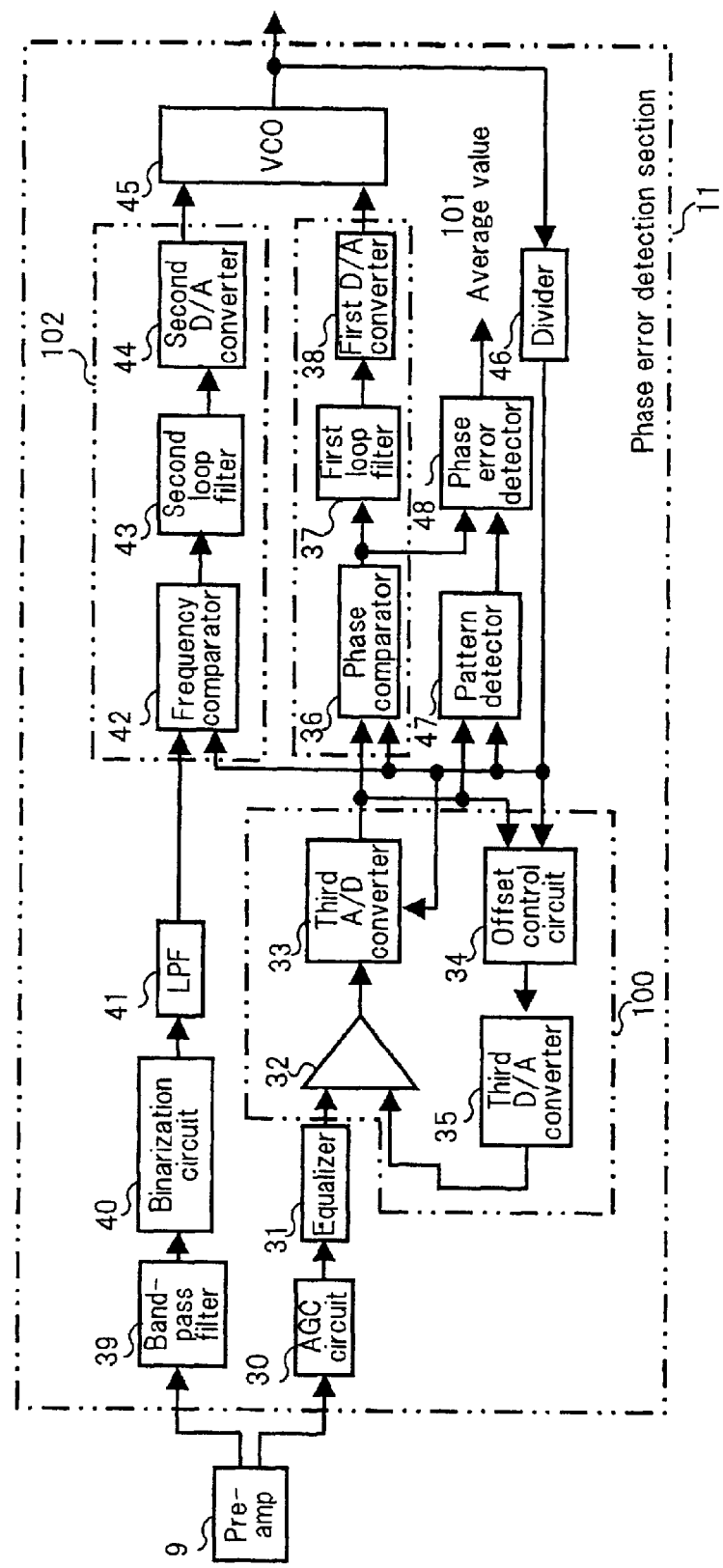
FIG. 6 is a block diagram showing the configuration of a phase error detection section in accordance with the first embodiment.

Next, the phase error detection section 11 in the information recording apparatus of the first embodiment will be described below. FIG. 6 is a block diagram showing the phase error detection section 11 in accordance with the first embodiment. In the phase error detection section 11 shown in FIG. 6, an example wherein a digital PLL (Digital Phase Lock Loop) is used is indicated. The configuration of the phase error detection section 11 will be described below.

As shown in FIG. 6, the signal output from the head amp 9 is input to an AGC circuit 30 and a band-pass filter 39 in the phase error detection section 11. In the phase error detection section 11, the AGC circuit 30 holds the output amplitude of the RF signal output from the head amp 9 constant, and an equalizer 31 improves the frequency characteristic of the output signal from the AGC circuit 30.

The output signal from the equalizer 31 is input to a differential amplifier 32, and the differential amplifier 32 subtracts a feedback voltage from the rear stage and outputs a signal to a third A/D converter 33. The third A/D converter 33 converts the potential of the output signal of the differential amplifier 32 into a digital value at each channel clock. An offset control circuit 34 extracts the DC component of the output signal of the third A/D converter 33. A third D/A converter 35 converts the digital output signal of the offset control circuit 34 into an analog voltage.

The differential amplifier 32, the third A/D converter 3, the offset control circuit 34 and the third D/A converter 35, configured as described above, constitute an offset control loop 100. In this offset control loop 100, the DC component of the signal input to the third A/D converter 33 is controlled so as to be set at the middle point of the conversion level of the third A/D converter 33. Assuming that the value obtained when the middle point of the conversion level is subjected to digital conversion is 0, when the input signal is lower than this, the third A/D converter 33 outputs a negative value, and when the signal is higher than this, the third A/D converter 33 outputs a positive value.

In the phase error detection section 11, a phase comparator 36 generates a phase error signal from the digital signal output from the third A/D converter 33. A first loop filter 37 eliminates unnecessary high-frequency components of the output signal from the phase comparator 36. A first D/A converter 38 converts the digital output signal of the first loop filter 37 into an analog signal. The phase comparator 36, the first loop filter 37 and the first D/A converter 38 described above constitute a phase control circuit 101 for fine adjustment.

In addition, as shown in FIG. 6, the radial push-pull signal output from the head amp 9 is input to the band-pass filter 39. In the band-pass filter 39, unnecessary frequency components in the radial push-pull signal output from the pre-amp 9 are eliminated, and a sine wave (hereafter referred to as a wobble signal) having a frequency corresponding to a recording guide groove periodically meandering on the optical disc 6 is extracted. A binarization circuit 40 binarizes the output signal of the band-pass filter 39, and a low-pass filter (LPF) 41 eliminates the chattering of the output signal of the binarization circuit 40.

A frequency comparator 42 counts the period of the output signal of the low-pass filter 41 using a channel clock described later, compares the count value with a reference value and outputs a frequency error signal. A second loop filter 43 eliminates unnecessary high-frequency components in the output signal of the frequency comparator 42. A second D/A converter 44 converts the digital output signal of the second loop filter 43 into an analog signal. The frequency comparator 42, the second loop filter 43 and the second D/A converter 44 described above constitute a frequency control circuit 102 for rough adjustment.

The output signal of the first D/A converter 38 and the output signal of the second D/A converter 44 are input to a voltage-controlled oscillator (hereafter simply referred to as a VCO) 45. The VCO 45 adds the output voltage of the first D/A converter 38 to the output voltage of the second D/A converter 44, thereby generating a clock signal having a frequency corresponding to the voltage obtained after the addition. A divider 46 divides the clock signal output from the VCO 45 into a signal having a desired frequency. The divided signal is converted into a signal having a system operation frequency in the information recording apparatus and supplied as a channel clock serving as a data extraction clock signal for the entire system.

A pattern detector 47 measures a data length in channel clock units, classifies the data of data patterns for each pattern of the combination of the length of a space and the length of a mark immediately after the space on the recording layer, and outputs a pattern signal. On the basis of the pattern signal output from the pattern detector 47, a phase error detector 48 adds the output of the phase comparator 36 for each pattern; after carrying out the addition for a constant period, the average value thereof is output.

The phase comparator 36, the pattern detector 47 and the phase error detector 48 in accordance with the first embodiment will be described more specifically by using FIG. 7 and FIG. 8.

Figure 7:
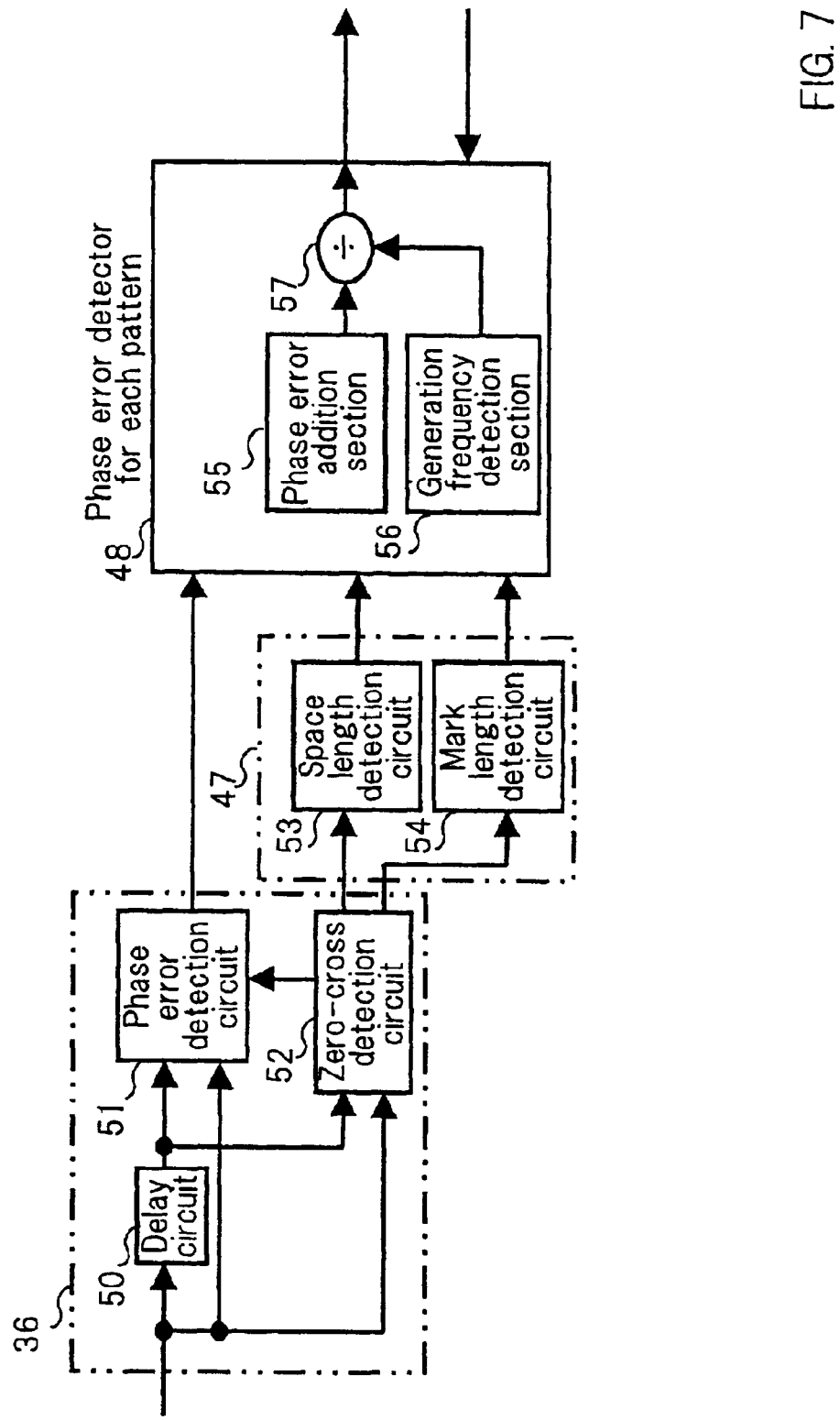
FIG. 7 is a block diagram showing the configurations of a phase comparator, a pattern detector and a phase error detector in accordance with the first embodiment.

FIG. 7 is a block diagram showing the configurations of the phase comparator 36, the pattern detector 47 and the phase error detector 48. FIG. 8 is an example of phase error tables for use in the first embodiment.

In FIG. 7, the delay circuit 50 of the phase comparator 36 delays an output value that is output one channel clock earlier from the third A/D converter 33 and inputs it to a phase error detection circuit 51. When a zero-cross signal is input from a zero-cross detection circuit 52 described later, the phase error detection circuit 51 makes the output of the third A/D converter 33 or the output thereof that is output one channel clock earlier, whichever is closer to 0 in voltage, effective. The zero-cross detection circuit 52 detects the change in the positive/negative signs of the output of the third A/D converter 33 and the output thereof that is output one channel clock earlier, and outputs a zero-cross signal to the phase error detection circuit 51 and the pattern detector 47.

On the basis of the zero-cross signal output from the zero-cross detection circuit 52, the space length detection circuit 53 of the pattern detector 47 measures pulse lengths in a zone wherein the output of the third A/D converter 33 is higher than a reference potential, in channel clock units. On the basis of the zero-cross signal output from the zero-cross detection circuit 52, a mark length detection circuit 54 measures pulse lengths in a zone wherein the output of the third A/D converter 33 is lower than the reference potential, in channel clock units.

A phase error addition section 55 in the phase error detector 48 has an individual storage area for each combination of the length of a mark and the length of a space immediately before the mark. This phase error addition section 55 selects a storage area on the basis of the output results of the space length detection circuit 53 and the mark length detection circuit 54, and carries out the addition of the output results of the phase error detection circuit 51 for a constant period.

In a similar way, a generation frequency detection section 56 in the phase error detector 48 has an individual storage area for each combination of the length of a mark and the length of a space immediately before the mark. This generation frequency detection section 56 selects a storage area on the basis of the output results of the space length detection circuit 53 and the mark length detection circuit 54, and carries out counting at each output of the phase error detection circuit 51 for a constant period. A divider 57 takes out the output of phase error addition section 55 and the output of the generation frequency detection section 56 for each combination of the length of a mark and the length of a space immediately before the mark, and carries out division.

With the above-mentioned phase error detection method, a phase error amount can be detected for each combination of the length of a mark and the length of a space immediately before the mark. By using this kind of phase error detection method, phase error tables shown in FIG. 8 are obtained.

FIG. 8 shows a phase error table (*a*) at the leading edges of marks and a phase error table (*b*) at the trailing edges of marks. In the phase error tables of FIG. 8, for example L3•3 indicates a phase error amount at the length 3T of a mark and the length 3T of a space immediately before the mark at the leading edge of the mark. In addition, for example T3•3 indicates a phase error amount at the length 3T of a mark and the length 3T of a space immediately before the mark at the trailing edge of the mark. In the phase error tables of FIG. 8, the combinations of the mark lengths and space lengths are all the combinations of the mark lengths and space lengths, individually having the values of 3T, 4T, 5T, 6T, 7T, 8T, 9T, 10T, 11T and 14T. Hence, some are omitted in FIG. 8.

In the first embodiment, record patterns having phase errors can be clarified by creating the phase error tables shown in FIG. 8. Hence, with the information recording apparatus and the information recording method of the first embodiment, by changing a parameter corresponding to a combination pattern having a phase error, it is possible to easily find recording conditions wherein the phase error becomes minimal.

Next, phase error detection during recording and reproduction of a specific data pattern.

Figure 9:
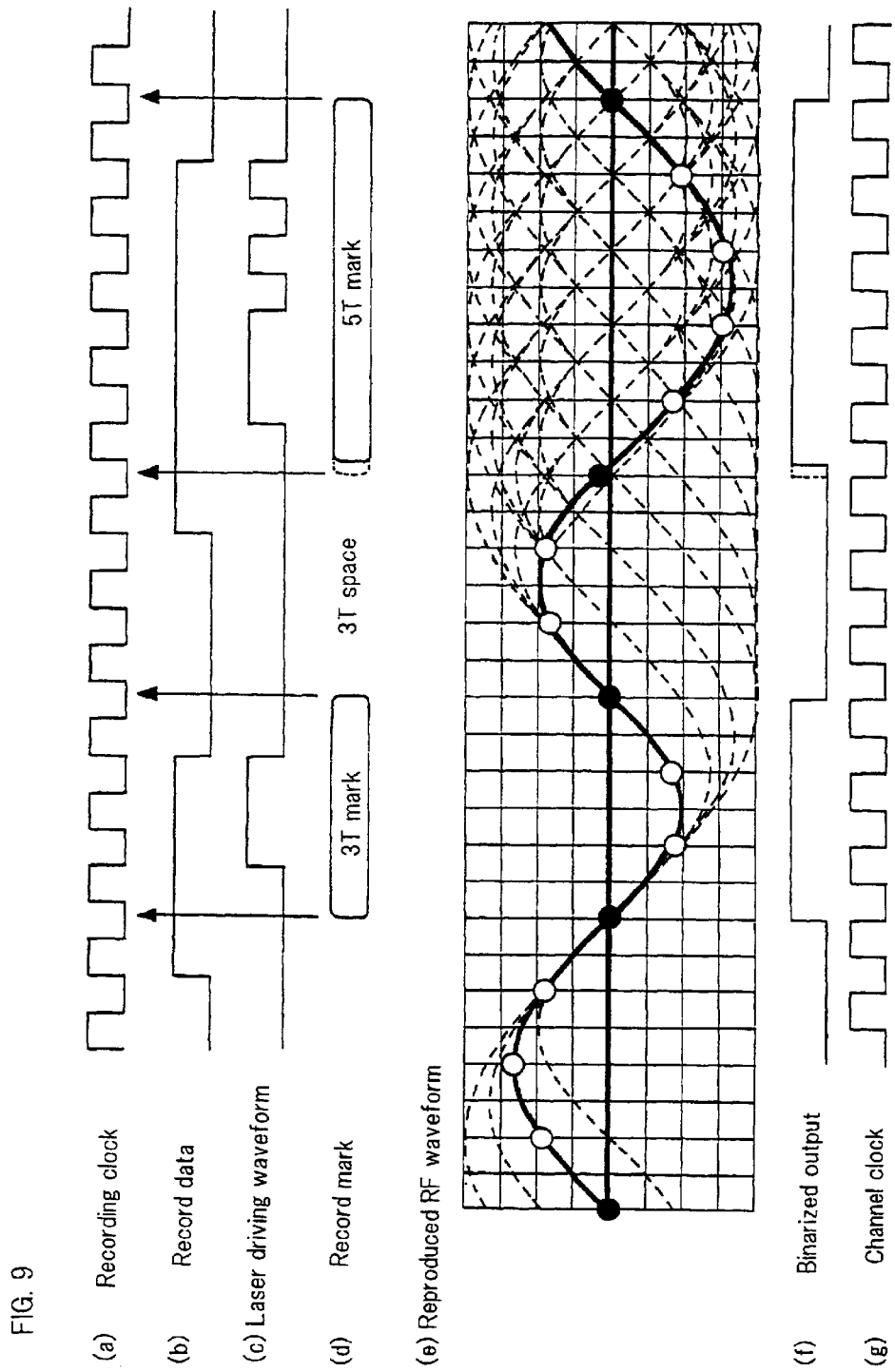
FIG. 9 is a waveform diagram showing waveforms at various sections during phase error adjustment in accordance with the first embodiment.

FIG. 9 shows examples of specific signal waveforms during recording and reproduction; (*a*) is a recording clock, (*b*) is record data for forming marks and spaces, (*c*) is laser driving waveform input to the laser driving section 2, and (*d*) shows marks and spaces formed on the recording layer of the optical disc 6. In addition, in FIG. 9, (*e*) is the reproduced waveform of the RF signal at the time when the record marks shown in (*d*) are reproduced, (*f*) is the binarized output waveform of the reproduced waveform, and (*g*) shows a channel clock serving as a data extraction clock signal.

It is assumed that, as the result of the recording and reproduction of data, for example as shown in FIG. 9, the potential of the reproduced waveform of the RF signal (the output of the third A/D converter 33) is higher than the reference level at the rising edge (leading edge) of the mark in the data pattern of 3T space and 5T mark (L3•5). In this case, it is possible to recognize that the leading edge position of the mark is behind its predetermined position, and it is necessary to change the emission waveform rule in a direction of widening the mark. In addition, its phase error amount can be obtained by dividing the output of the third A/D converter 33 converted depending on the timing of the corresponding channel clock by the voltage change rate of the RF signal. In other words, by changing the parameter L3•5 for adjusting the leading edge position of the mark of the above-mentioned data pattern by an amount corresponding to the phase error amount, the parameter can be changed to a recording compensation parameter L3•5T1d having a small phase error. Herein, L3.5T1d indicates the recording compensation parameter at the leading edge of the mark in the combination of 3T space and 5T mark.

By carrying out measurements similar to those described above, by creating phase error tables and by detecting phase errors for all data patterns, it is possible to determine recording conditions wherein phase errors in data patterns of all combinations are small.

Next, a procedure for correcting a recording pulse train in the information recording apparatus of the first embodiment configured as described above will be described by using FIG. 10 and FIG. 11.

Figure 10:
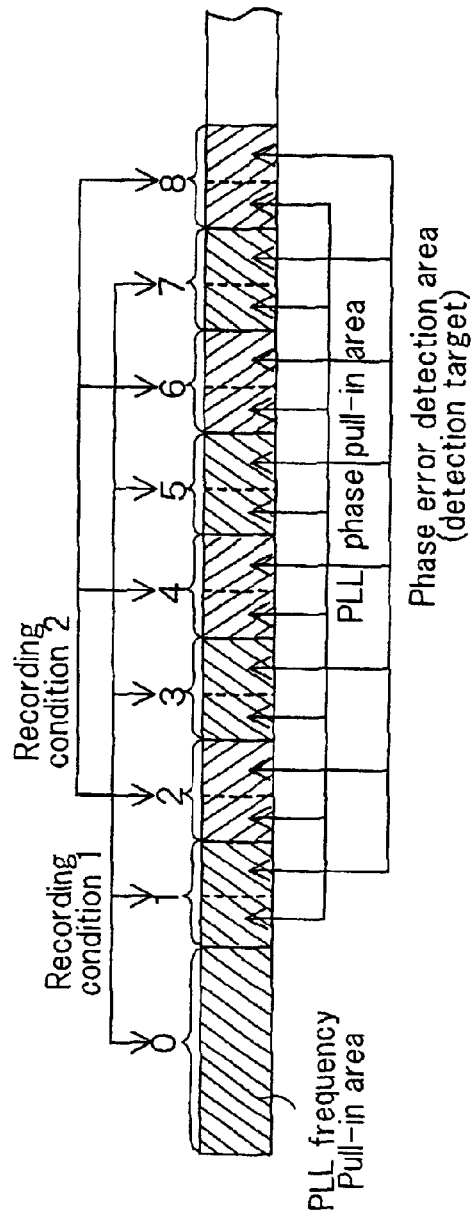
FIG. 10 is a conceptual view illustrating recording operation during phase error adjustment in accordance with the first embodiment.

FIG. 10 is a conceptual view showing the arrangement of data to be recorded on the optical disc 6 at the time when an emission waveform rule is determined. In the first embodiment, an example wherein one track is largely divided into four portions and recording is carried out at each portion in two recording conditions is shown. The reason why one track is divided into four portions is to eliminate the AC components of stress due to rotation. In addition, the reason why recording is carried out in the two recording conditions is to detect the relationship between the output of the third A/D converter 33 and the phase error amount.

As shown in FIG. 10, a PLL frequency pull-in area is formed at the head of this track. To detect the phase error amount, it is necessary to reproduce recorded data and to apply PLL to the RF signal generated as the result. Hence, a slight spare area for frequency pull-in is reserved at the head of the track. In addition, a slight spare area is also reserved in each area of the track so that PLL is stabilized even when the emission waveform rule is changed.

Figure 11:
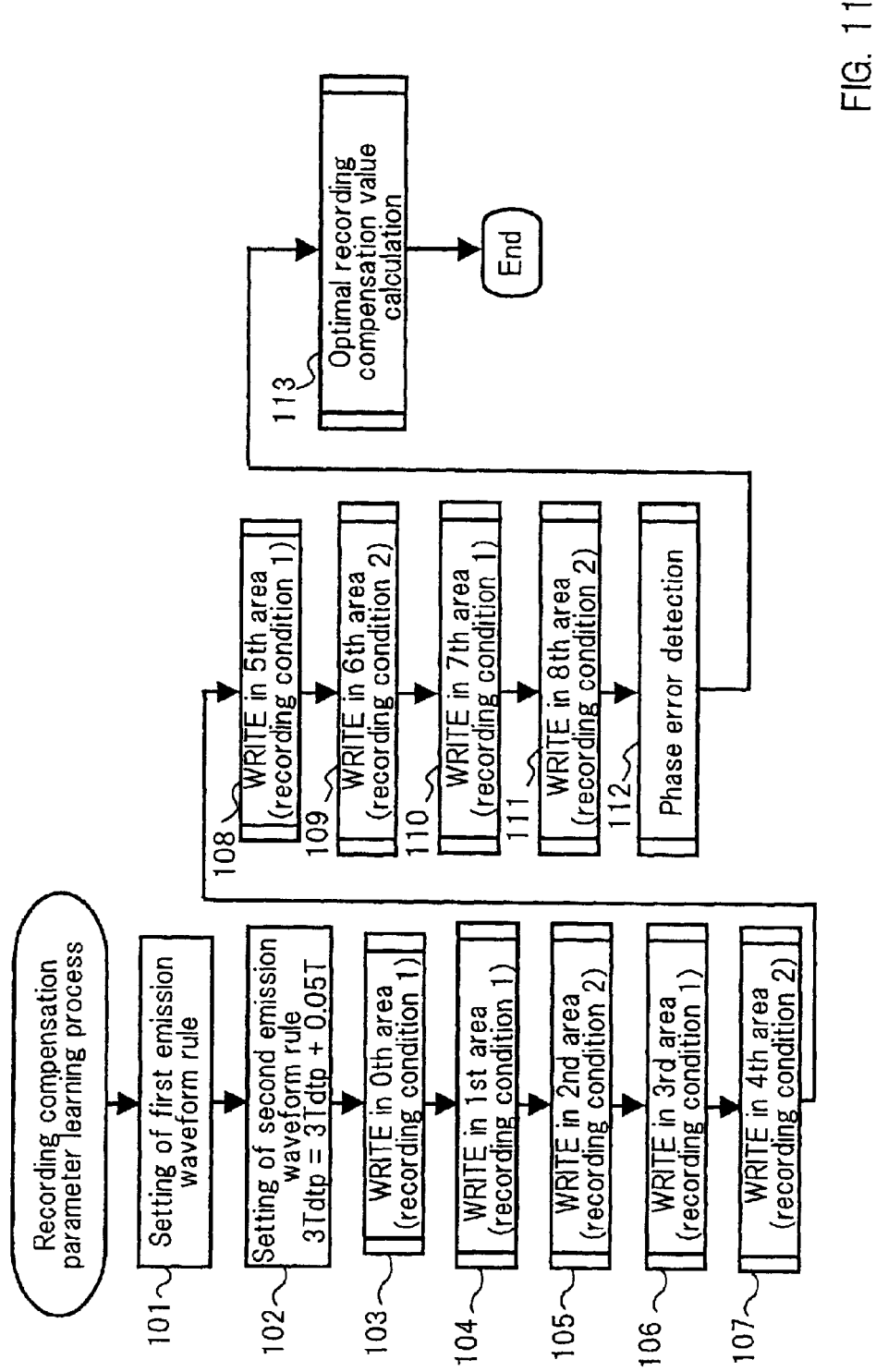
FIG. 11 is a flowchart showing a recording compensation parameter learning process during phase error adjustment in accordance with the first embodiment.

FIG. 11 is a flowchart showing a recording pulse train correction procedure in the information recording apparatus of the first embodiment and also showing a recording compensation parameter learning process.

First, in the information recording apparatus, an emission waveform rule predetermined for each recording medium on which recording should be carried out is set as a first emission waveform rule (at step 101 of FIG. 11). For example in the case of a DVD-R disc, an emission waveform rule having been set by a recording medium manufacturer has been recorded at pre-pits formed in land portions. This emission waveform rule is set as the first emission waveform rule (recording condition 1). However, in the first embodiment, it is possible that an emission waveform rule corresponding to a recording medium, on which recording should be carried out by the information recording apparatus, is set as necessary.

Next, in the recording compensation parameter learning process of the first embodiment, an emission waveform rule that uniformly shifts the leading edges of 3T marks forward by a predetermined value is set as a second emission waveform rule (recording condition 2). This setting is carried out at step 102 of FIG. 11 and indicated as 3Tdtp= 3Tdtp+0.05T. Herein, 3Tdtp indicates the position of the leading edge of the top waveform (Ttop) of a recording pulse train at the time when a mark having a length three times (3T) as long as the frequency of the channel clock is formed. In other words, at step 102, it is indicated that the position of the leading edge of the top waveform (Ttop) is shifted forward by "0.05T." Furthermore, in the first embodiment, the emission waveform rule that uniformly shifts the leading edge of a 3T mark forward is selected; however, a process that changes the parameter of a portion different from the 3T mark may also be used.

Next, at step 103, a PLL frequency pull-in pattern is written in the 0th area shown in the above-mentioned FIG. 10 in the recording condition 1.

Next, in accordance with the arrangement shown in FIG. 10, one-rotation track is divided into 8 areas, and a predetermined data pattern is recorded (from step 104 to step 111 of FIG. 11).

In the odd-numbered areas, 1, 3, 5 and 7, the data pattern is recorded by applying the first emission waveform rule (recording condition 1), and in the even-numbered areas, 2, 4, 6 and 8, the data pattern is recorded by applying the second emission waveform rule (recording condition 2) (from step 104 to step 111). The data pattern (record pattern) recorded in the first embodiment is a repeated pattern of 144T formed of 3TS-3TM-3TS-4TM-3TS-5TM-3TS-6TM-4TS-3TM-4TS-4TM-4TS-5TM-4TS-6TM-5TS-3TM-5TS-4TM-5TS-5TM-5TS-6TM-6TS-3TM-6TS-4TM-6TS-5TM-6TS-6TM. Herein, M designates a mark and S designates a space. In other words, "3TS-3TM-3TS-4TM" indicates that a 3T space, a 3T mark, a 3T space and a 4T mark are recorded in this order. In the data pattern of the first embodiment, data including all the patterns from 3T to 6T are used for the combinations from space (S) to mark (M). The data pattern used herein does not include marks and spaces having a length of 7T or more. This is because a phase error amount relating to marks and spaces having a length of 7T or more can be substituted with marks and spaces having a length of 6T. In addition, by typifying long marks and long spaces by those having a length of 6T, the data length of the data pattern is made shortest, thereby leading to improvement in SNR (S/N ratio). Furthermore, since the generation frequency of 6T is high in random data, jitter occurring during recording of random data can be generated, whereby highly reliable compensation operation can be attained.

The data pattern in the recording compensation parameter learning process of the first embodiment does not include any synchronous patterns for synchronization; however, a synchronous pattern may be included as necessary so that a synchronous pattern process is carried out.

Furthermore, in the DVD format, marks and spaces having a length of 14T are included in a SYNC (synchronous) pattern, whereby the marks and spaces having a length of 14T may be used as learning objects in the recording compensation parameter learning process of the first embodiment.

Next, respective areas from the first area to the eighth area, in which the data pattern serving as a test pattern is recorded, are reproduced. The phase error detector 48 (see FIGS. 6 and 7) carries out an averaging process for stable areas wherein the PLL is stabilized (at step 112).

In the first area, a phase error amount is detected in respective cases of L3•3-1, L3•4-1, L3•5-1, L3•6-1, L4•3-1, L4•4-1, L4•5-1, L4•6-1, L5•3-1, L5•4-1, L5•5-1, L5•6-1, L6•3-1, L6•4-1, L6•5-1, L6•6-1, T3•3-1, T3•4-1, T3•5-1, T3•6-1, T4•3-1, T4•4-1, T4•5-1, T4•6-1, T5•3-1, T5•4-1, T5•5-1, T5•6-1, T6•3-1, T6•4-1, T6•5-1 and T6•6-1. Herein, L3•3-1 indicates the phase error amount value (parameter) at the leading edge of a mark in the combination of a 3T mark and a 3T space immediately before the 3T mark in the first area. In addition, T3•3-1 indicates the phase error amount value at the trailing edge of the mark in the combination of a 3T mark and a 3T space immediately before the 3T mark.

Furthermore, in the second area, a phase error amount is detected in respective cases of L3•3-2, L3•4-2, L3•5-2, L3 6-2, L4 3-2, L4 4-2, L4•5-2, L4•6-2, L5•3-2, L5•4-2, L5•5-2, L5•6-2, L6•3-2, L6•4-2, L6•5-2, L6•6-2, T3•3-2, T3•4-2, T3•5-2, T3•6-2, T4•3-2, T4•4-2, T4•5-2, T4•6-2, T5•3-2, T5•4-2, T5•5-2, T5•6-2, T6•3-2, T6•4-2, T6•5-2 and T6•6-2. In this way, a phase error amount is detected similarly in the respective cases in the third and the following areas.

In order to eliminate the influence of the AC components of stress, the phase error detector 48 averages the phase error amounts in the respective cases of the odd-numbered areas, that is, the first area, third area, fifth area and seventh area, wherein recording is carried out by applying the first emission waveform rule. In this case, average phase error amounts, that is, L3•3-A, L3•4-A, L3•5-A, L3•6-A, L4•3-A, L4•4-A, L4•5-A, L4•6-A, L5•3-A, L5•4-A, L5•5-A, L5•6-A, L6•3-A, L6•4-A, L6•5-A, L6•6-A, T3•3-A, T3•4-A, T3•5-A, T3•6-A, T4•3-A, T4•4-A, T4•5-A, T4•6-A, T5•3-A, T5•4-A, T5•5-A, T5•6-A, T6•3-A, T6•4-A, T6•5-A and T6•6-A, are obtained by the phase error detector 48 and then output.

Still further, the phase error amounts in the respective cases of the even-numbered areas, that is, the second area, fourth area, sixth area and eighth area, wherein recording is carried out by applying the second emission waveform rule, are averaged. In this case, average phase error amounts, that is, L3•3-B, L3•4-B, L3•5-B, L3•6-B, L4•3-B, L4•4-B, L4•5-B, L4•6-B, L5•3-B, L5•4-B, L5•5-B, L5•6-B, L6•3-B, L6•4-B, L6•5-B, L6•6-B, T3•3-B, T3•4-B, T3•5-B, T3•6-B, T4•3-B, T4•4-B, T4•5-B, T4•6-B, T5•3-B, T5•4-B, T5•5-B, T5•6-B, T6•3-B, T6•4-B, T6•5-B and T6•6-B, are obtained by the phase error detector 48 and then output.

In the first embodiment, the second emission waveform rule is set so that the leading edge of the top waveform (Ttop) of a 3T mark is shifted forward by 0.05T with respect to that in the first emission waveform rule. Hence, the differences between the average phase error amounts in the odd-numbered areas and the average phase error amounts in the even-numbered areas calculated as described above, that is, (L33-A)–(L33-B), (L43-A)–(L43-B), (L53-A)–(L53B) and (L63-A)–(L63-B), indicate a change amount corresponding to 0.05T. Hence, by comparing the phase error amounts in areas wherein recording is carried out on the basis of the two different emission waveform rules, the output of the third A/D converter 33 can be converted into a time-base value, since the difference therebetween corresponds to an adjustment step (0.05T in the first embodiment).

Hence, if an average phase error amount exceeding ½ of the adjustment step occurs as the result of the measurement and comparison of the phase error amounts obtained when the areas wherein recording is carried out on the basis of the first emission waveform rule and the second emission waveform rule are reproduced, it is possible to set an emission waveform rule that minimizes the phase errors by changing the corresponding parameter. As described above, a phase error is detected at step 112 of FIG. 11, and optimal recording compensation value calculation is carried out at step 113. This optimal recording compensation value calculation will be explained below by using FIG. 12.

Figure 12:
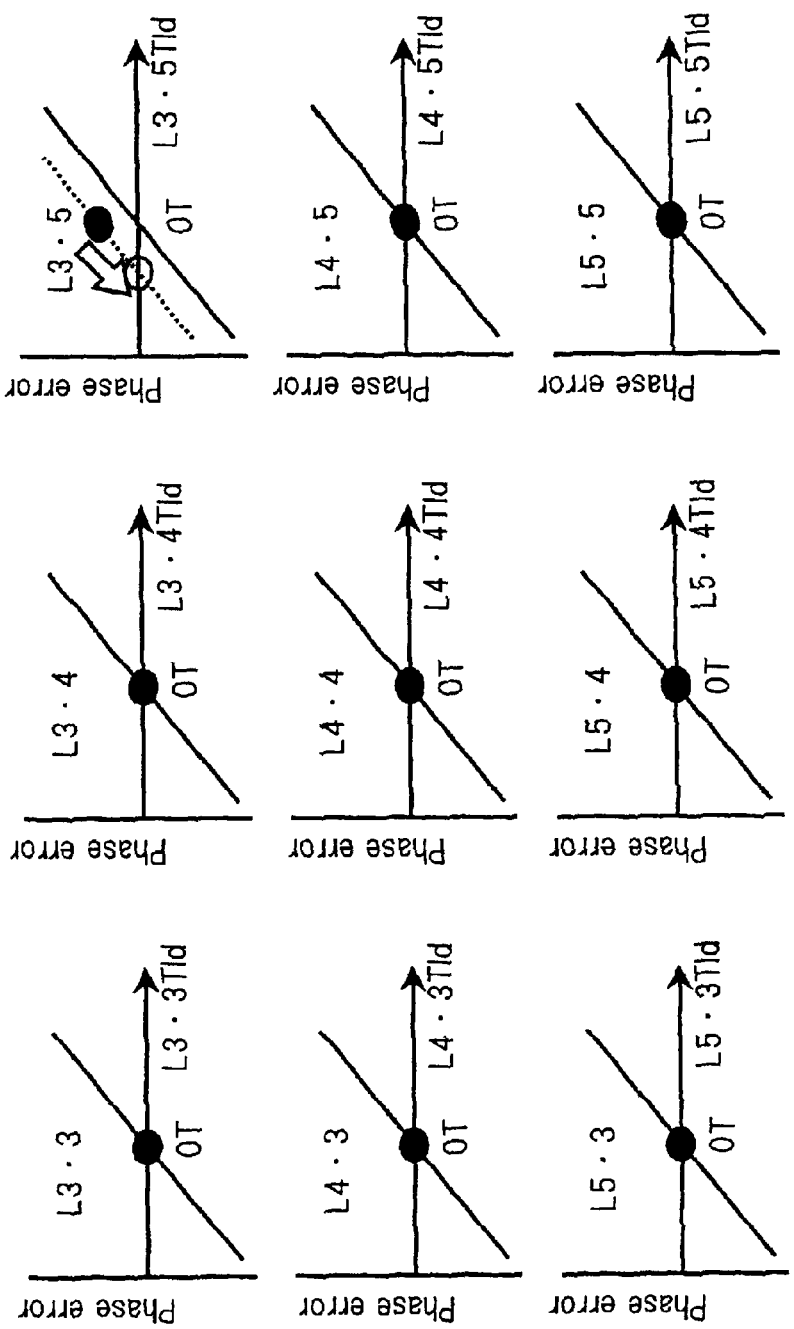
FIG. 12 is an explanatory view showing the operation of a recording compensation parameter adjustment section in accordance with the first embodiment.

FIG. 12 is a graph of each pattern, showing an example of the relationship between the phase error measured in a data pattern and the recording compensation parameter in the first embodiment. In FIG. 12, ● indicates a phase error amount measured at the time when the recording compensation parameter is 0T. In addition, the phase error is substantially proportional to the recording compensation parameter, and the oblique line (solid line and dotted line) in each graph indicates the relationship between the phase error and the recording compensation parameter in the first embodiment. This tilt is obtained by the fact that the difference obtained by comparing the phase error amounts in the area wherein recording is carried out on the basis of the two different emission waveform rules indicates a change amount corresponding to 0.05T.

In FIG. 12, for example in the case of L3•3 shown at upper left, the phase error amount was 0. In addition, as shown in FIG. 12, in the cases other than L3•5, the phase error amount was 0. However, in the case of L3•5, the leading edge of a 5T mark following a 3T space was delayed. Hence, the recording compensation parameter L3•5T1d relating to the leading edge of the 5T mark following the 3T space is adjusted. By dividing the phase error amount in the case of L3•5 by the change amount corresponding to the above-mentioned 0.05T, it is possible to calculate the recording compensation parameter L3•5T1d to be changed. In the case of L3•5 shown at upper right, the value of the recording compensation parameter L3•5T1d is the value at the intersection (indicated by ○ in the figure) of the dotted line and the phase error 0 line. In other words, the value of the recording compensation parameter L3•5T1d can be obtained by subtracting a value corresponding to the phase error amount to be changed from the value at the time of ±0.00T (the position of ●). By using the recording compensation parameter L3•5T1d obtained in this way, the phase error at the leading edge of the 5T mark following the 3T space can be reduced.

As described above in the first embodiment, recording power is adjusted by asymmetry. In addition, in the first embodiment, by recording the data pattern for approximately one rotation and by reproducing the recorded area, the phase error of a pattern for each combination of the length of a mark and the length of a space immediately before the mark is measured. In the information recording apparatus and the information recording method in accordance with the first embodiment of the present invention, the emission waveform rule is changed on the basis of each phase error measured as described above, whereby optimal recording conditions are determined; it is thus possible to learn recording conditions for minimizing the phase error at the time of reproduction.

As described above, the information recording apparatus of the first embodiment in accordance with the present invention is an information recording apparatus using a mark edge recording system for recording information on a recording medium at the leading edge and the trailing edge of each mark, comprising:

the recording section 1, 3, 4 and 5 for recording record data by applying laser light to the recording face of the above-mentioned recording medium on the basis of a recording pulse train determined depending on the length of a recorded mark and the length of a space immediately before or after the recorded mark, the reproduction section 7, 8 and 9 for reproducing information recorded on the above-mentioned recording medium and for outputting a reproduced RF signal, the recording power optimization section 14 and 15 for extracting information changing depending on recording power, such as asymmetry and modulation degree, from the above-mentioned reproduced RF signal in a recording pulse train determined for each recording medium and for determining recording power so that the extracted information becomes a predetermined value, the phase error detection section 11 for generating a data extraction clock signal from the above-mentioned reproduced RF signal and for detecting the phase difference between the above-mentioned reproduced RF signal and the above-mentioned data extraction clock signal as a phase error for each combination of the length of a mark and the length of a space immediately before or after the mark, the recording compensation parameter adjustment section 12 for determining an optimal emission waveform rule on the basis of the phase error detected by the above-mentioned phase error detection section at the recording power determined by the above-mentioned recording power optimization section, and the recording pulse train correction section 13 for correcting the above-mentioned recording pulse train on the basis of the emission waveform rule determined by the above-mentioned recording compensation parameter adjustment section.

In addition, the information recording method of the first embodiment in accordance with the present invention is an information recording method using a mark edge recording system for recording information on a recording medium at the leading edge and the trailing edge of each mark, comprising:

the step of recording record data by applying laser light to the recording face of the above-mentioned recording medium on the basis of the recording pulse train determined depending on the length of a recorded mark and the length of a space immediately before or after the recorded mark, the step of outputting the reproduced RF signal from the above-mentioned recording medium, the step of generating a data extraction clock signal from the above-mentioned reproduced RF signal, the step of detecting the phase error between the above-mentioned reproduced RF signal and the above-mentioned data extraction clock signal for each combination of the length of a mark and the length of a space immediately before or after the mark, the step of determining recording power for extracting information changing depending on recording power, such as asymmetry and modulation degree, from the above-mentioned reproduced RF signal in a recording pulse train determined for each recording medium and for determining recording power so that the extracted information becomes a predetermined value, the step of determining an emission waveform rule for the above-mentioned recording medium by adjusting a recording compensation parameter on the basis of the above-mentioned phase error for each combination of the length of a mark and the length of a space immediately before or after the mark, the step of correcting for the recording pulse train on the basis of the determined emission waveform rule, and the step of applying desired laser, driven by the recording pulse train corrected by the above-mentioned determined recording power, to the above-mentioned recording medium.

In the information recording apparatus of the first embodiment in accordance with the present invention, configured as described above, the emission waveform rule is changed for each pattern, whereby optimal recording conditions for an optical disc can be determined. In addition, in the information recording apparatus of the first embodiment in accordance with the present invention, recording conditions for minimizing the phase error amount can be easily learnt by carrying out recording of about one track, whereby the test area of a write-once recording disc can be utilized effectively.

<<Second Embodiment>>

Next, an information recording apparatus and an information recording method of a second embodiment in accordance with the present invention will be described below by using the accompanying FIG. 13.

Figure 13:
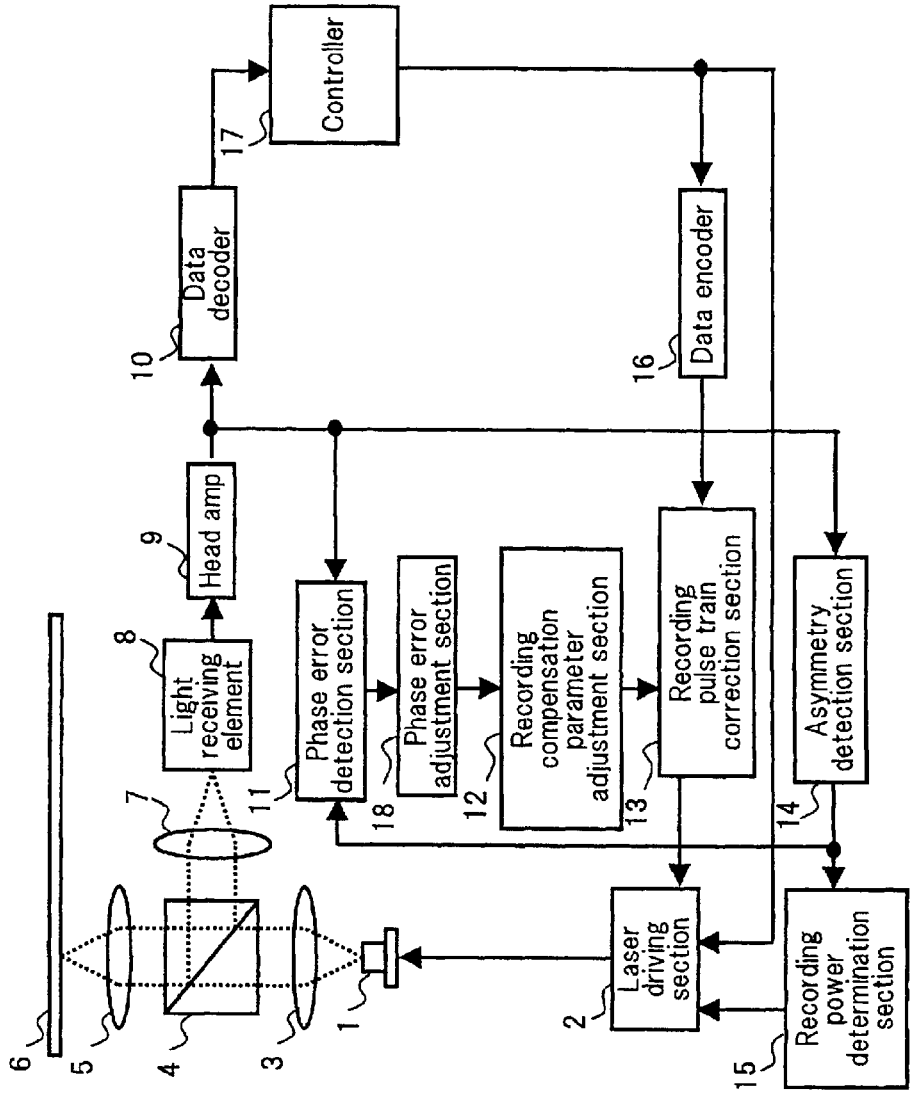
FIG. 13 is a block diagram showing the configuration of the information recording apparatus of a second embodiment in accordance with the present invention.

FIG. 13 is a block diagram showing the configuration of the information recording apparatus of the second embodiment in accordance with the present invention.

The components of the information recording apparatus of the second embodiment shown in FIG. 13 are substantially identical to the components described in the above-mentioned first embodiment. The second embodiment differs from the first embodiment in that a phase error adjustment section 18 is provided. Hence, in the second embodiment, the components having the functions and configurations substantially identical to those of the components of the first embodiment are designated by the same numerals and their detailed explanations are omitted.

In the information recording apparatus of the second embodiment, a semiconductor laser 1 serving as a laser light source is driven by a laser driving section 2, and laser light from the semiconductor laser 1 is condensed and applied to an optical disc 6 via a collimator lens 3, a beam splitter 4 and an objective lens 5. In addition, the reflected light from the optical disc 6 enters a light-receiving element 8 via a detection lens 7. After converting optical information into an electrical signal, the light-receiving element 8 outputs the electrical signal to a head amp 9. The head amp 9 converts the electrical signal from the light-receiving element 8 into the physical information of the optical disc 6. A data decoder 10 carries out processes, such as demodulation and error correction, for the output signal from the head amp 9, thereby generating recorded data. It is herein assumed that the semiconductor laser 1, the laser driving section 2, the collimator lens 3, the beam splitter 4 and the objective lens 5 constitute a recording section. In addition, it is assumed that the detection lens 7, the light-receiving element 8 and the head amp 9 constitute a reproduction section.

A phase error detection section 11 detects a phase error from a channel clock for each record pattern. The phase error adjustment section 18 applies an offset to the output of the phase error detection section 11 depending on target asymmetry. The recording compensation parameter adjustment section 12 optimizes an emission waveform rule on the basis of a signal from the phase error adjustment section 18. A recording pulse train correction section 13 corrects a control signal supplied to the laser driving section 2 depending on the record data output from a data encoder 16. An asymmetry detection section 14 detects the asymmetry of the RF signal obtained when the recorded signal is reproduced. A recording power determination section 15 determines optimal recording power on the basis of the result of the asymmetry detection section 14. A data encoder 16 assigns an error correction code to data to be recorded and carries out data modulation, thereby generating a basic laser light driving signal. A controller 17 controls the whole of the information recording apparatus of the second embodiment configured as described above.

The information recording apparatus of the second embodiment configured as described above differs from the first embodiment in that the phase error adjustment section 18 is provided and that this phase error adjustment section 18 adjusts the detection result of the phase error detection section 11 on the basis of the asymmetry detection result by the asymmetry detection section 14.

Figure 14:
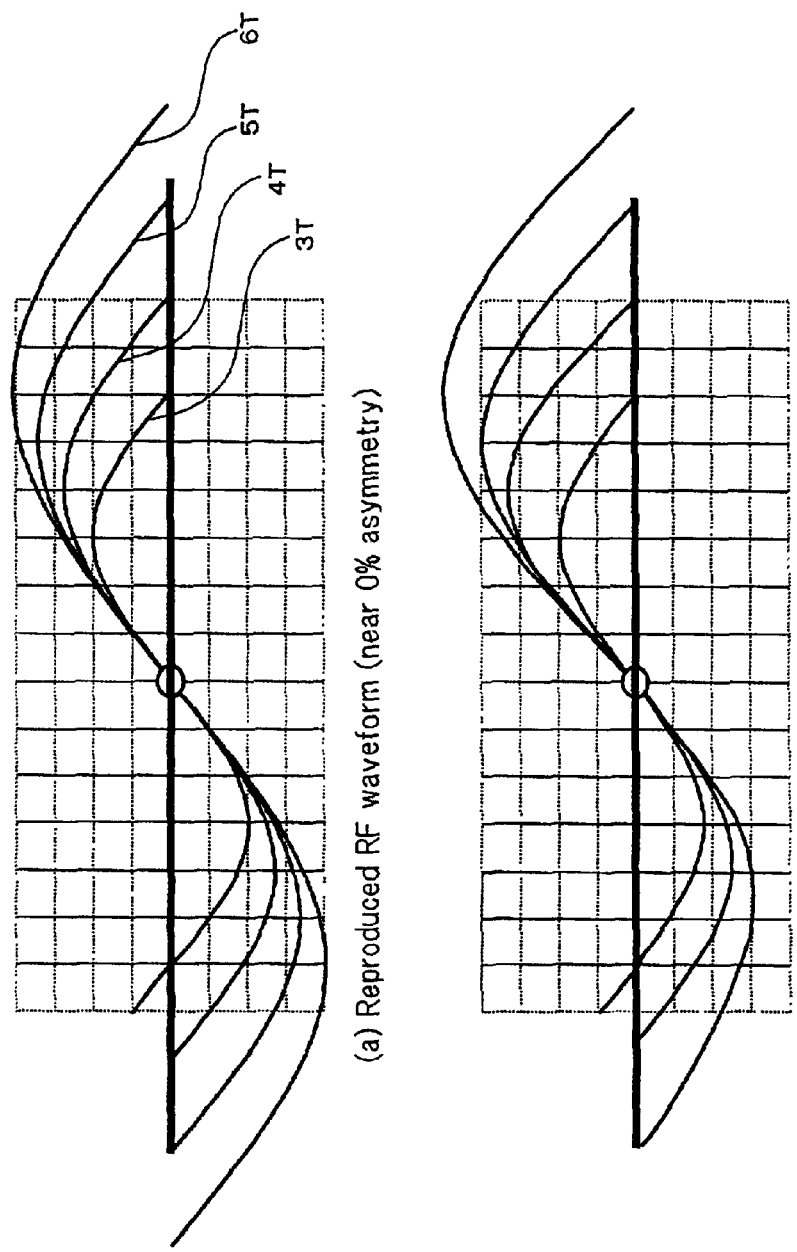
FIG. 14 is a waveform diagram illustrating RF signals having different asymmetry values in accordance with the second embodiment.

When target asymmetry becomes high, the potential on the dark level side of the RF signal is immediately saturated at a long mark (for example, 6T), resulting in a problem of impairing the symmetry of the RF signal. In FIG. 14, (a) shows an example of the waveform of the reproduced RF signal near 0% asymmetry, and (b) shows an example of the waveform of the reproduced RF signal near 10% asymmetry. The signal symmetry of a 3T signal is maintained even near 10% asymmetry; however, the signal symmetry at a long mark (6T) is lost when the asymmetry increases.

The phase error detection section 11 in accordance with the above-mentioned embodiment 1 carries out sampling at the channel clock timing near the code change time of the RF signal from the head amp 9 by using the third AD converter 33 (FIG. 6). In addition, the phase error detection section 11 averages sampling values for a constant period, thereby measuring a phase error amount. Since the phase error detection section 11 in accordance with the first embodiment has this kind of configuration, a phenomenon wherein the detected phase error amount changes depending on asymmetry occurs.

FIG. 15 is a graph showing how the detected phase error amount changes depending on asymmetry. In FIG. 15, (a) shows the generation frequency distribution of phase errors in the case when the abscissa represents phase error and the ordinate represents generation frequency. In addition, (b) shows the phase error amount near 0% asymmetry in the case when the abscissa represents phase error and the ordinate represents phase error * generation frequency, and (c) shows phase error amount near 10% asymmetry in the case when the abscissa represents phase error and the ordinate represents phase error * generation frequency.

As shown in FIG. 15(b), near 0% asymmetry, the characteristic of the phase error * generation frequency is symmetrical in both of the signal of a short mark (3T) and the signal of a long mark (6T). On the other hand, as shown in FIG. 15(c), near 10% asymmetry, the characteristic of the phase error * generation frequency is symmetrical in the signal of a short mark (3T); however, the characteristic of the phase error * generation frequency is asymmetrical in the signal of a long mark (6T) owing to the saturation of the signal. Hence, the phase error amount obtained from the summation result of the phase error values changes depending on the length of the mark.

Therefore, in the second embodiment, the phase error adjustment section 18 is provided at the lower stage of the phase error detection section 11 so that the target value of the phase error amount of each pattern is set individually depending on the asymmetry of record data. By providing the phase error adjustment section 18 in the information recording apparatus of the second embodiment as described above, the deviation of the phase error amount occurring when a digital PLL is used can be corrected. Hence, the information recording apparatus of the second embodiment can correct the detected phase error amount even when the asymmetry increases, and can detect highly accurate phase error amounts.

As described above, the information recording apparatus of the second embodiment in accordance with the present invention is an information recording apparatus using a mark edge recording system for recording information on a recording medium at the leading edge and the trailing edge of each mark, comprising:

the recording section 1, 3, 4 and 5 for recording record data by applying laser light to the recording face of the above-mentioned recording medium on the basis of a recording pulse train determined depending on the length of a recorded mark and the length of a space immediately before or after the recorded mark, the reproduction section 7, 8 and 9 for reproducing information recorded on the above-mentioned recording medium and for outputting a reproduced RF signal, the recording power optimization section 14 and 15 for extracting information changing depending on recording power, such as asymmetry and modulation degree, from the above-mentioned reproduced RF signal in a recording pulse train determined for each recording medium and for determining recording power so that the extracted information becomes a predetermined value, the phase error detection section 11 for generating a data extraction clock signal from the above-mentioned reproduced RF signal and for detecting the phase difference between the above-mentioned reproduced RF signal and the above-mentioned data extraction clock signal as a phase error for each combination of the length of a mark and the length of a space immediately before or after the mark, the phase error adjustment section 18 for setting an offset to an output signal from the above-mentioned phase error detection section depending on target asymmetry detected by the above-mentioned recording power optimization section, the recording compensation parameter adjustment section 12 for determining an optimal emission waveform rule on the basis of the compensated phase error from the above-mentioned phase error adjustment section at the recording power determined by the above-mentioned recording power optimization section, and the recording pulse train correction section 13 for correcting the above-mentioned recording pulse train on the basis of the emission waveform rule determined by the above-mentioned recording compensation parameter adjustment section.

In addition, the information recording method of the second embodiment in accordance with the present invention is an information recording method using a mark edge recording system for recording information on a recording medium at the leading edge and the trailing edge of each mark, comprising:

the step of recording record data by applying laser light to the recording face of the above-mentioned recording medium on the basis of the recording pulse train determined depending on the length of a recorded mark and the length of a space immediately before or after the recorded mark, the step of outputting the reproduced RF signal from the above-mentioned recording medium, the step of generating a data extraction clock signal from the above-mentioned reproduced RF signal, the step of detecting the phase error between the above-mentioned reproduced RF signal and the above-mentioned data extraction clock signal for each combination of the length of a mark and the length of a space immediately before or after the mark, the step of determining recording power for extracting information changing depending on recording power, such as asymmetry and modulation degree, from the above-mentioned reproduced RF signal in a recording pulse train determined for each recording medium and for determining recording power so that the extracted information becomes a predetermined value, the step of determining an emission waveform rule for the above-mentioned recording medium by adjusting a recording compensation parameter on the basis of the above-mentioned phase error for each combination of the length of a mark and the length of a space immediately before or after the mark, the step of compensating for the recording pulse train on the basis of the determined emission waveform rule, the step of applying desired laser, driven by the recording pulse train corrected by the above-mentioned determined recording power, to the above-mentioned recording medium, and the step of adjusting a phase error depending on phase error data detected for each combination of the length of a mark and the length of a space immediately before or after the mark and asymmetry.

In the information recording apparatus of the second embodiment in accordance with the present invention, configured as described above, the emission waveform rule is changed for each pattern in consideration of asymmetry, whereby optimal recording conditions for an optical disc can be determined securely. In addition, in the information recording apparatus of the second embodiment in accordance with the present invention, recording conditions for minimizing the phase error amount can be easily learnt by carrying out recording of about one track, whereby the test area of a write-once recording disc can be utilized effectively.

<<Third Embodiment>>

Next, an information recording apparatus and an information recording method of a third embodiment in accordance with the present invention will be described below using the accompanying FIG. 16.

Figure 16:
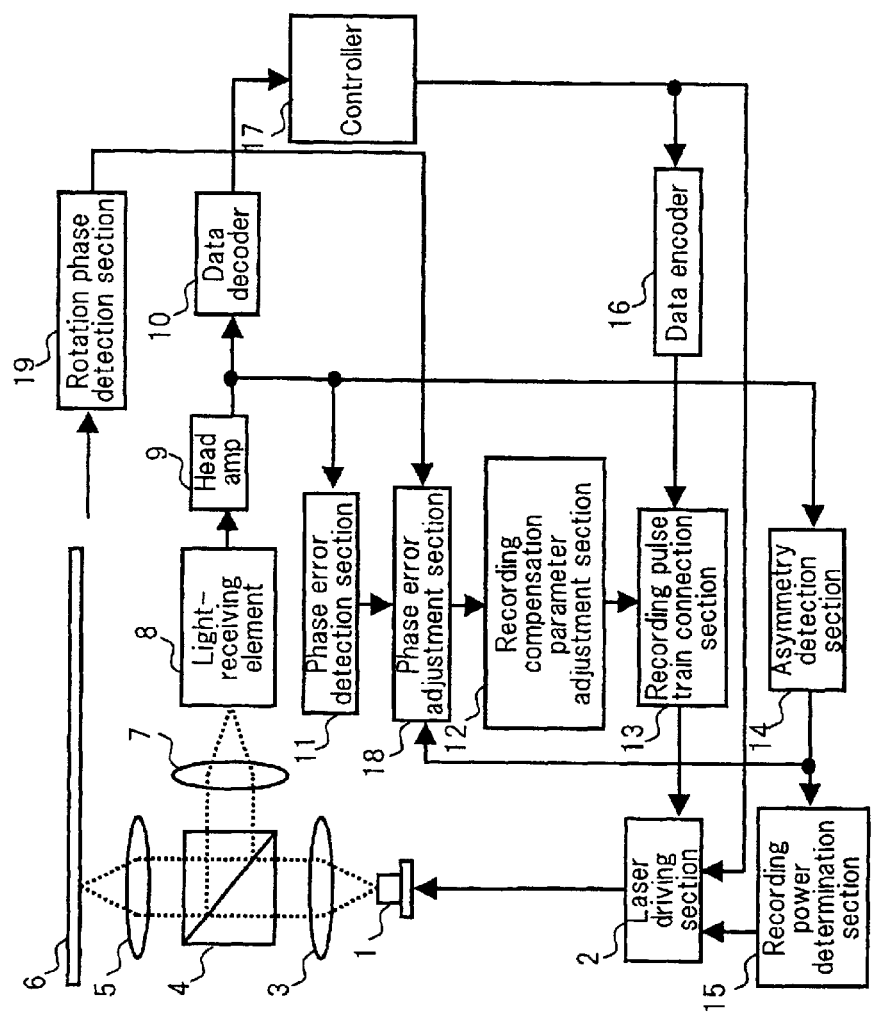
FIG. 16 is a block diagram showing the configuration of the information recording apparatus of a third embodiment in accordance with the present invention.

FIG. 16 is a block diagram showing the configuration of the information recording apparatus of the third embodiment in accordance with the present invention.

The components of the information recording apparatus of the third embodiment shown in FIG. 16 are substantially identical to the components described in the above-mentioned second embodiment. The third embodiment differs from the second embodiment in that a rotation phase detection section 19 for detecting the rotation state of the optical disc 6 is provided. Hence, in the third embodiment, the components having the functions and configurations substantially identical to those of the components of the first embodiment and the second embodiment are designated by the same numerals and their detailed explanations are omitted.

In the information recording apparatus of the third embodiment, a semiconductor laser 1 serving as a laser light source is driven by a laser driving section 2, and laser light from the semiconductor laser 1 is condensed and applied to an optical disc 6 via a collimator lens 3, a beam splitter 4 and an objective lens 5. In addition, the reflected light from the optical disc 6 enters a light-receiving element 8 via a detection lens 7. After converting optical information into an electrical signal, the light-receiving element 8 outputs the electrical signal to a head amp 9. The head amp 9 converts the electrical signal from the light-receiving element 8 into the physical information of the optical disc 6. A data decoder 10 carries out processes, such as demodulation and error correction, for the output signal from the head amp 9, thereby generating recorded data. It is herein assumed that the semiconductor laser 1, the laser driving section 2, the collimator lens 3, the beam splitter 4 and the objective lens 5 constitute a recording section. In addition, it is assumed that the detection lens 7, the light-receiving element 8 and the head amp 9 constitute a reproduction section.

A phase error detection section 11 detects a phase error from a channel clock for each record pattern. The rotation phase detection section 19 detects the rotation phase of the optical disc 6 and outputs the rotation phase signal to a phase error adjustment section 18. The phase error adjustment section 18 applies an offset to the output of the phase error detection section 11 depending on target asymmetry. The recording compensation parameter adjustment section 12 optimizes an emission waveform rule on the basis of a signal from the phase error adjustment section 18. A recording pulse train correction section 13 corrects a control signal supplied to the laser driving section 2 depending on the record data output from a data encoder 16. An asymmetry detection section 14 detects the asymmetry of the RF signal obtained when the recorded signal is reproduced. A recording power determination section 15 determines optimal recording power on the basis of the result of the asymmetry detection section 14. A data encoder 16 assigns an error correction code to data to be recorded and carries out data modulation, thereby generating a basic laser light driving signal. A controller 17 controls the whole of the information recording apparatus of the third embodiment configured as described above.

The information recording apparatus of the third embodiment configured as described above differs from the above-mentioned second embodiment in that the phase error adjustment section 18 measures the AC components of the phase error amount corresponding to the rotation phase of the optical disc 6 in advance and adjusts the offset of the phase error detection section for each rotation phase of the optical disc 6 and that the asymmetry detection section detects asymmetry for each rotation phase.

The track of the optical disc 6 may tilt in its tangential direction; in other words, a tangential tilt may occur because of a mechanical problem in the information recording apparatus, a problem at the time of chucking the optical disc 6, etc. If such a tangential tilt occurs in the optical disc 6 as described below, an offset occurs in the output of the phase error detection section 11 during reproduction. In order to eliminate a rotation change component, that is, the offset in this kind of the optical disc 6, in the conventional information recording apparatus, after recording for at least one disc rotation was carried out, phase errors for the entire one rotation having been recorded were detected, and the phase errors were averaged.

In the information recording apparatus of the third embodiment, the phase error adjustment section 18 measures a phase error in a test pattern area for phase error detection recorded during one rotation of the disc for every rotation phase of the optical disc 6. In addition, the asymmetry detection section 14 detects the asymmetry of the RF signal for every rotation phase of the optical disc 6. As described above, the information recording apparatus of the third embodiment is configured to detect a phase error and asymmetry for every rotation phase of the optical disc 6. Then, the offset adjustment of the output signal of the phase error detection section 11 is carried out for every rotation phase of optical disc 6, thereby absorbing measurement errors due to rotation fluctuation caused by a tangential tilt or the like. Furthermore, since asymmetry is recognized for every rotation phase, the phase error can be adjusted depending on asymmetry.

In the conventional information recording apparatus, test pattern recording is carried out for at least one disc rotation, and the test pattern is reproduced for the entire one rotation, thereby detecting phase errors. In the information recording apparatus of the third embodiment, a phase error and asymmetry are measured for each rotation phase of the optical disc, whereby by carrying out offset adjustment corresponding to the rotation phase, phase error detection can be carried out even in the case of recording for less than one rotation.

Furthermore, in the above-mentioned embodiment, a configuration example wherein the learning of the head pulse and the learning of the subsequent multiple pulses are carried out simultaneously is explained; however, the present invention is not limited to this kind of configuration; the embodiment may be configured so that after the multiple pulses are adjusted, recording power learning is carried out again and then the head pulse is adjusted.

Still further, in combination of an information reproducing apparatus, the information recording apparatus used in the above-mentioned embodiment can constitute an information recording/reproducing apparatus. The information recording/reproducing apparatus configured in this way has excellent effects similar to those explained in the above-mentioned embodiments and determines an optimal write strategy (laser emission waveform rule) for each recording time, thereby capable of carrying out information in appropriate recording conditions.

As described above, the information recording apparatus in accordance with the present invention is configured to correct and record a recording pulse train depending on at least one of recording speed and operation temperature. The recording power determination section of the information recording apparatus determines recording power so that the asymmetry of the reproduced RF signal becomes predetermined target asymmetry. The recording power determination section uses the asymmetry having been set depending on its kind and stored by pre-pitting or pre-writing on the optical disc serving as a recording medium in advance as the target asymmetry. The recording power determination section determines the target asymmetry on the basis of the asymmetry of the pre-written area wherein data has been recorded in advance. The recording power determination section determines recording power so that the modulation degree of the reproduced RF signal becomes a predetermined target modulation degree. The recording power determination section uses the modulation degree having been set depending on its kind and stored by pre-pitting or pre-writing on a recording medium in advance as the target modulation degree. The recording power determination section determines the target modulation degree on the basis of the modulation degree of the pre-written area wherein data has been recorded in advance. The phase error detection section uses the difference between the average of the A/D conversion outputs at mark edges and the average of the A/D conversion outputs at past mark edges. The phase error detection section sets the offset of a phase error for each data pattern determined by the combination of the length of a mark and the length of a space immediately before the mark depending on the target asymmetry. A specific pattern for phase error detection has been recorded on one or more rotation portions of the recording face of the recording medium for use in the present invention.

An information recording method in accordance with the present invention has a step of adjusting recording power and recording pulse width; when the recording power and recording pulse width are adjusted, the learning result of the adjustment is recorded in an area of a recording medium; and when additional writing is carried out on the recording medium, the learning result of the past adjustment is confirmed and then recorded. When recording is carried out on the recording medium at the third time and after, the learning result of the adjustment carried out at the first time is used. The information recording method in accordance with the present invention carries out recording at least two times on the basis of an emission waveform rule during one rotation of the optical disc, and obtains this relationship between the emission waveform rule and phase error as the result of the detection depending on the difference in reproduced signals thereof. In the information recording method in accordance with the present invention wherein emission control is carried out by the combination of a head pulse and multiple pulses, the method may also be configured so that after the learning of recording power is carried out, the learning of the multiple pulses is carried out, and the learning of recording power is carried out again, and then the learning of the head pulse is carried out. In the information recording method in accordance with the present invention, data is recorded by the combination of a mark and a space having a length of 3 periods (3T) to 6 periods (6T) of a data extraction clock signal, and the phase error between the reproduced RF signal of the data and the data extraction clock signal is measured for each combination of the length of a mark and the length of a space immediately before the mark, whereby an emission waveform rule is set.

In the above-mentioned embodiment, an example wherein the circumference of the optical disc is divided into four areas and data is recorded is explained; however, the present invention is not limited to this division number.

As described above, the information recording apparatus of the third embodiment in accordance with the present invention is an information recording apparatus using a mark edge recording system for recording information on an optical disc serving as a recording medium at the leading edge and the trailing edge of each mark, comprising:

the recording section 1, 3, 4 and 5 for recording record data by applying laser light to the recording face of the above-mentioned recording medium on the basis of a recording pulse train determined depending on the length of a recorded mark and the length of a space immediately before or after the recorded mark, the reproduction section 7, 8 and 9 for reproducing information recorded on the above-mentioned recording medium and for outputting a reproduced RF signal, the recording power optimization section 14 and 15 for extracting information changing depending on recording power, such as asymmetry and modulation degree, from the above-mentioned reproduced RF signal in a recording pulse train determined for each recording medium and for determining recording power so that the extracted information becomes a predetermined value, the phase error detection section 11 for generating a data extraction clock signal from the above-mentioned reproduced RF signal and for detecting the phase difference between the above-mentioned reproduced RF signal and the above-mentioned data extraction clock signal as a phase error for each combination of the length of a mark and the length of a space immediately before or after the mark, the rotation phase detection section 19 for measuring the rotation change components of the above-mentioned phase error detection section depending on phase errors detected in a one-rotation recording area wherein recording is carried out on the above-mentioned optical disc in the same condition, the phase error adjustment section 18 for setting the offset of the above-mentioned phase error detection section depending on the measured rotation phase, the recording compensation parameter adjustment section 12 for determining an optimal emission waveform rule on the basis of the compensated phase error from the above-mentioned phase error adjustment section at the recording power determined by the above-mentioned recording power optimization section, and the recording pulse train correction section 13 for correcting the above-mentioned recording pulse train on the basis of the emission waveform rule determined by the above-mentioned recording compensation parameter adjustment section.

In addition, the information recording method of the third embodiment in accordance with the present invention is an information recording method using a mark edge recording system for recording information on a recording medium at the leading edge and the trailing edge of each mark, comprising:

the step of recording record data by applying laser light to the recording face of the above-mentioned recording medium on the basis of the recording pulse train determined depending on the length of a recorded mark and the length of a space immediately before or after the recorded mark, the step of outputting the reproduced RF signal from the above-mentioned recording medium, the step of generating a data extraction clock signal from the above-mentioned reproduced RF signal, the step of detecting the phase error between the above-mentioned reproduced RF signal and the above-mentioned data extraction clock signal for each combination of the length of a mark and the length of a space immediately before or after the mark, the step of determining recording power for extracting information changing depending on recording power, such as asymmetry and modulation degree, from the above-mentioned reproduced RF signal in a recording pulse train determined for each recording medium and for determining recording power so that the extracted information becomes a predetermined value, the step of determining an emission waveform rule for the above-mentioned recording medium by adjusting a recording compensation parameter on the basis of the above-mentioned phase error for each combination of the length of a mark and the length of a space immediately before or after the mark, the step of compensating for the recording pulse train on the basis of the determined emission waveform rule, the step of applying desired laser, driven by the recording pulse train corrected by the above-mentioned determined recording power, to the above-mentioned recording medium, a step of detecting the rotation phase of the recording medium having been mounted, and a step of adjusting the phase error for every rotation phase of the above-mentioned recording medium on the basis of the data of the detected rotation phase.

In the information recording apparatus of the third embodiment in accordance with the present invention configured as described above, the emission waveform rule is changed for each pattern in consideration of the rotation phase of an optical disc, whereby optimal recording conditions for the optical disc can be determined securely. In addition, in the information recording apparatus of the third embodiment in accordance with the present invention, recording conditions for minimizing the phase error amount can be easily learnt by carrying out recording of about one track, whereby the test area of a write-once recording disc can be utilized effectively.

In the third embodiment in accordance with the present invention, by learning the optimization conditions for recording compensation (write strategy), the step of detecting the optimal recording power can be omitted. In that case, in the information recording method in accordance with the present invention, after the optimal recording conditions between a recording medium and a disc recording/reproducing apparatus is learnt, the optimization conditions are recorded on the recording medium or the disc recording/reproducing apparatus. After this, the optimal recording conditions are restored by reproducing the optimal recording conditions. At this time, the restoration can be attained by carrying out only the recording power optimizing step of correcting power drop due to lens aperture or the like as necessary.

<<Fourth Embodiment>>

An information recording system of a fourth embodiment in accordance with the present invention will be described below by using the accompanying FIG. 17.

Figure 17:
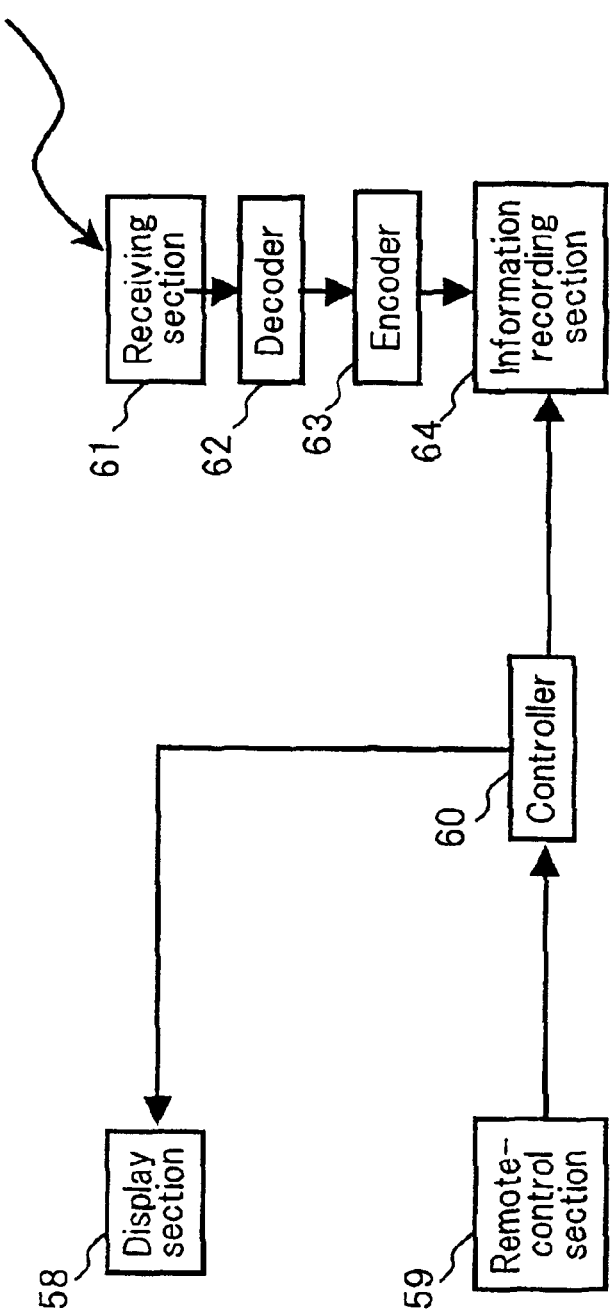
FIG. 17 is a block diagram showing the configuration of the information recording system of a fourth embodiment in accordance with the present invention.
Figure 19:
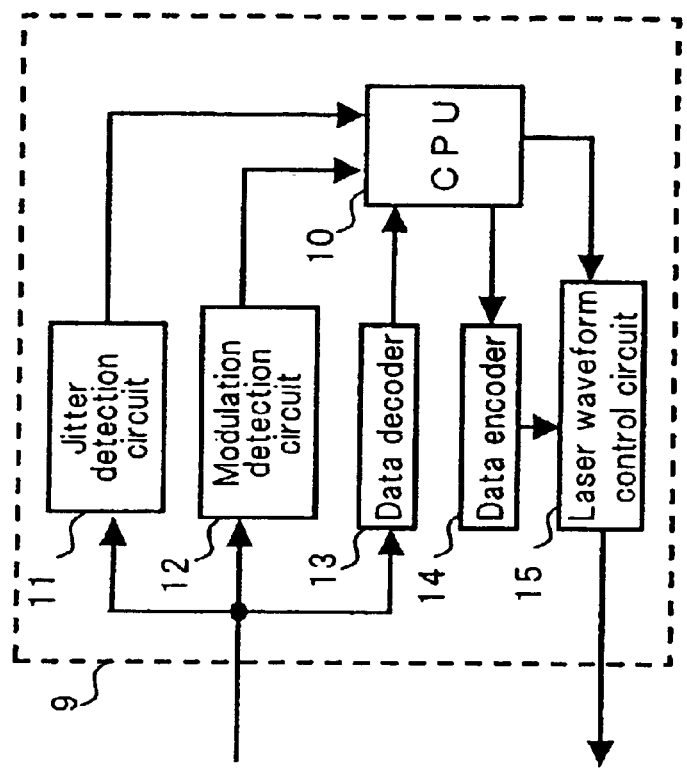
FIG. 19 is a block diagram showing the configuration of a controller in the information recording apparatus of FIG. 18.
Figure 18:
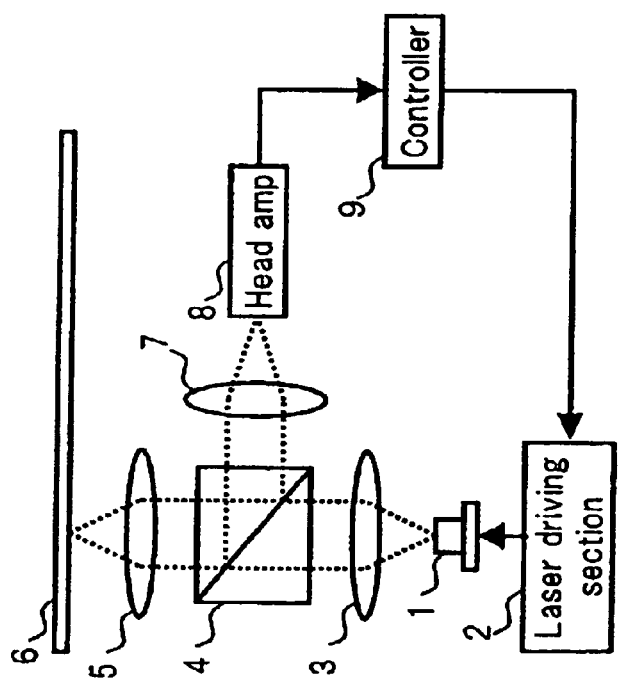
FIG. 18 is a block diagram showing the configuration of the conventional information recording apparatus.
Figure 20:
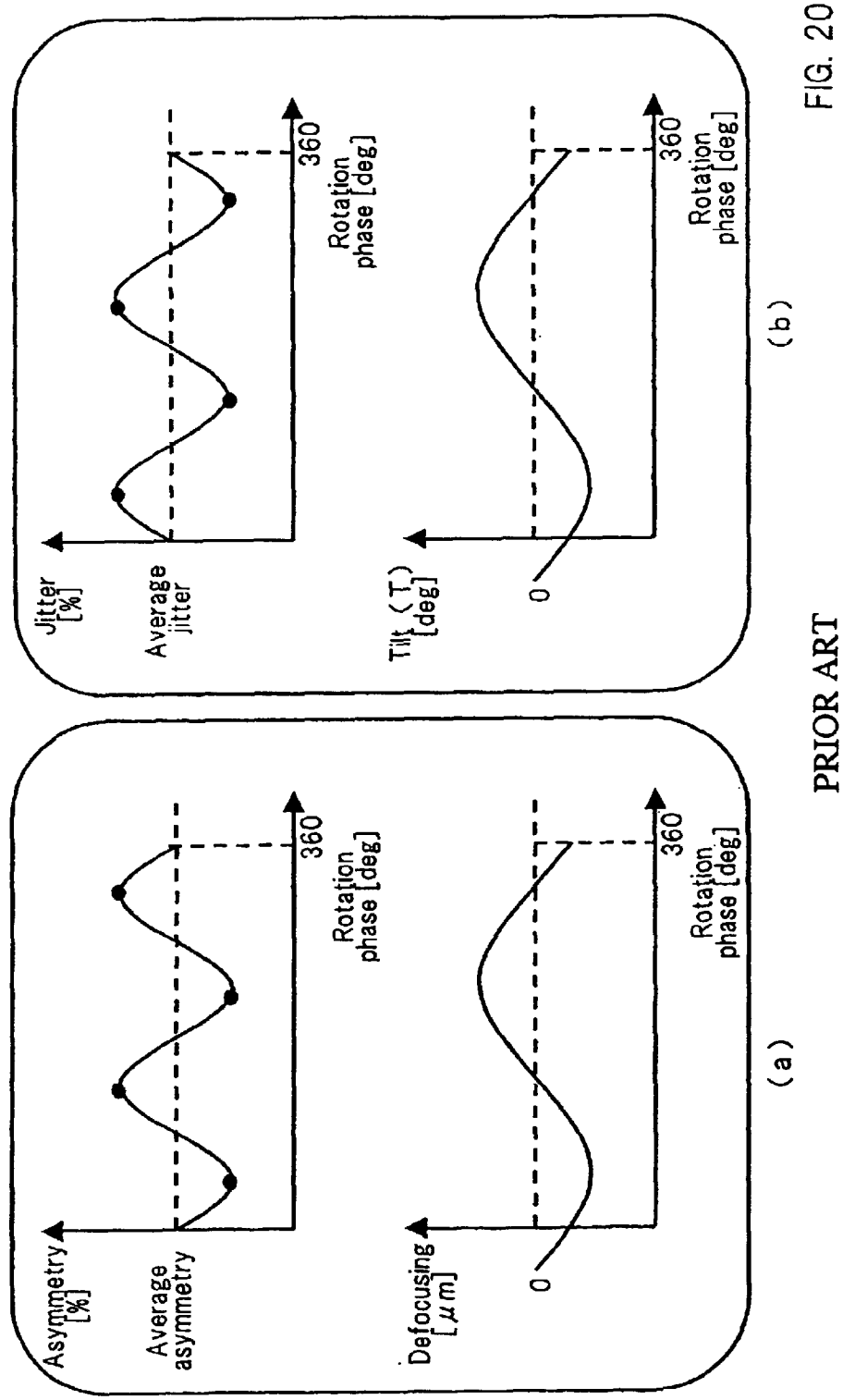
FIG. 20 is a waveform diagram showing the measured values and the like of asymmetry and jitter in the conventional information recording apparatus.

FIG. 17 is a block diagram showing the configuration of the information recording system of the fourth embodiment of the present invention. The fourth embodiment of the present invention is an information recording system provided with the information recording apparatus described in the above-mentioned first to third embodiments.

In FIG. 17, a display section 58 is a monitor for displaying various kinds of information regarding an information recording section 64 for a user. A remote-control section 59 is used by the user to input commands to the information recording section 64. A controller 60 controls the whole information recording system on the basis of the commands from the remote-control section 59. A receiving section 61 receives broadcasts, such as terrestrial broadcasts. A decoder 62 converts received broadcasts into audio or video information. An encoder 63 converts audio or video information into data suited for recording.

The information recording section 64 in accordance with the fourth embodiment of the present invention is an information recording apparatus having a function capable of carrying out recording on the optical disc explained in the first to third embodiments. In other words, the information recording section 64 in accordance with the fourth embodiment has an emission waveform rule for recording and a recording power learning function.

When the user carried out picture recording scheduling by using the remote-control section 59, its picture recording scheduling command is received and read by the controller 60. Then, to the information recording section 64, the controller 60 issues commands for the learning process for the emission waveform rule and recording power. As a result, the information recording section 64 carries out the learning process for the emission waveform rule and recording power as described in the above-mentioned first embodiment. After the end of the learning process, the result of the learning is held once until the start of the scheduled program, and the information recording section enters standby mode. At this time, if the emission waveform rule and the recording power cannot be determined, it is judged that the optical disc is abnormal, and a message urging the user to replace the optical disc is issued from the display section 58.

When a scheduled program starts, for example a terrestrial broadcast delivered via an electric wave is received by the receiving section 61 and sent to the information recording section 64 via the decoder 62 and the encoder 63. At this time, the received program data is converted into a desired data format and sent to the information recording section 64, and the program is recorded by using the learning result obtained in advance by the learning process.

As described above, the information recording system of the fourth embodiment in accordance with the present invention comprises:

the information recording apparatus 64, in each of the above-mentioned embodiments, having a function of learning an emission waveform rule and recording power for recording, the display section 58 for displaying various kinds of information regarding the above-mentioned information recording section, the remote-control section 59 for inputting commands to the above-mentioned information recording section, the controller 60 for controlling the whole system on the basis of the commands from the above-mentioned remote-control section, the receiving section 61 for receiving broadcasts, such as terrestrial broadcasts, the decoder 62 for converting received broadcasts into audio or video information, and the encoder 63 for converting audio or video information into data suited for recording.

As described above, in the information recording system of the fourth embodiment, a learning process is carried out for an optical disc mounted at the time of scheduling operation, and the result of the learning is sent to the user. Hence, if the mounted optical disc is a medium being incapable of recording, it is possible to urge the user to replace the disc. This configuration can prevent trouble of being unable to record programs in the case when scheduling is carried out by using an optical disc having many disc imperfections such as defects or being incompatible with the information recording section.

Furthermore, errors during the learning of the emission waveform rule and recording power can be easily treated by carrying out trial writing and by measuring the reproduction characteristics at the error portions.

As described above, in the information recording system in accordance with the present invention, the information recording apparatus having the function of learning the emission waveform rule and the recording power for recording is used as the storage apparatus of a picture recording apparatus for recording transient data, such as a broadcast, and the learning of the emission waveform rule is carried out immediately after a data recording command (program scheduling, for example) is received. In addition, in the information recording system in accordance with the present invention, the learning of the recording power is carried out immediately after a data recording command (program scheduling, for example) is received. Furthermore, in the information recording system in accordance with the present invention, in the case when the learning of the emission waveform rule or the recording power ends abnormally, a notice that a learning error has occurred is sent to a person who issued the recording command, and optical disc replacement is requested.

As described above, in the information recording apparatus, the information recording method and the information recording system of the present invention, data is recorded in an area of about one rotation of an optical disc, and the recorded area is reproduced, and a phase error for every combination of the length of a mark and the length of a space immediately before or after the mark is measured. In the present invention, the emission waveform rule is changed for every pattern on the basis of the phase errors measured as described above, whereby it is possible to determine optimal recording conditions for the optical disc. Hence, in the information recording apparatus, the information recording method and the information recording system of the present invention, recording conditions for minimizing phase error amounts can be learnt easily by carrying out recording of about one track, whereby the test area of a write-once recording disc can be utilized effectively. As a result, with this invention, the number of data writing times can be increased significantly.

With this invention, the target value of each write strategy element, that is, an object to be controlled, can be corrected by one recording operation.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An information recording apparatus, using a mark edge recording system for recording information on a recording medium at the leading edge and the trailing edge of each mark, comprising:

a recording section for recording record data by applying laser light to the recording face of said recording medium on the basis of a recording pulse train determined depending on the length of a recorded mark and the length of a space immediately before or after the recorded mark, a reproduction section for reproducing information recorded on said recording medium and for outputting a reproduced RF signal, a recording power optimization section for extracting information on asymmetry and modulation degree changing depending on recording power from said reproduced RF signal in a recording pulse train determined for each recording medium and for determining recording power so that the extracted information becomes a predetermined value, a phase error detection section for generating a data extraction clock signal from said reproduced RF signal and for detecting the phase difference between said reproduced RE signal and said data extraction clock signal as a phase error for each combination of the length of a mark and the length of a space immediately before or after the mark, a recording compensation parameter adjustment section for determining an optimal emission waveform rule on the basis of the phase error detected by said phase error detection section at the recording power determined by said recording power optimization section, and a recording pulse train correction section for correcting said recording pulse train on the basis of the emission waveform rule determined by said recording compensation parameter adjustment section.

2. An information recording apparatus in accordance with claim 4, wherein said recording medium is an optical disc, one circle of the recording track of said optical disc is divided into at least two areas, recording is carried out in the respective divided areas in different recording conditions, the phase error of a reproduced RF signal in each area is detected, and an emission waveform rule wherein the phase error amount becomes zero is estimated on the basis of the phase error amount obtained in each recording condition.

3. An information recording apparatus in accordance with claim 1, wherein the recording pulse train is corrected and recorded depending on at least one of recording speed and operation temperature.

4. An information recording apparatus in accordance with claim 1, wherein said recording power optimization section determines recording power so that the asymmetry of said reproduced RF signal becomes a predetermined target asymmetry.

5. An information recording apparatus in accordance with claim 1, wherein said recording power optimization section uses the asymmetry having been set depending on its kind and stored by pre-pitting or pre-writing on said recording medium in advance as a target asymmetry.

6. An information recording apparatus in accordance with claim 1, wherein said recording power optimization section determines a target asymmetry on the basis of the asymmetry of a pre-written area wherein data has been recorded in advance.

7. An information recording apparatus in accordance with claim 1, wherein said recording power optimization section determines recording power so that the modulation degree of said reproduced RE signal becomes a predetermined target modulation degree.

8. An information recording apparatus in accordance with claim 1, wherein said recording power optimization section uses the modulation degree having been set depending on its kind and stored by pre-pitting or pre-writing on said recording medium in advance as a target modulation degree.

9. An information recording apparatus in accordance with claim 1, wherein said recording power optimization section determines a target modulation degree on the basis of the modulation degree of the pre-written area wherein data has been recorded in advance.

10. An information recording apparatus in accordance with claim 1, wherein said phase error detection section uses a difference between an average of A/D conversion outputs at mark edges and an average of A/D conversion outputs at past mark edges.

11. An information recording apparatus in accordance with claim 1, wherein said phase error detection section sets the offset of a phase error for each data pattern determined by the combination of the length of a mark and the length of a space immediately before the mark depending on a target asymmetry.

* * * * *